United States Patent [19]
Shackleford

[11] Patent Number: 5,410,719
[45] Date of Patent: Apr. 25, 1995

[54] FIELD COMPOSITOR FOR MERGING DATA AND INCLUDING CELLS EACH RECEIVING THREE CONTROL AND TWO DATA INPUTS AND GENERATING ONE CONTROL AND ONE DATA OUTPUT THEREFROM

[75] Inventor: J. Barry Shackleford, Menlo Park, Calif.

[73] Assignee: Hewlett-Packard Company, Palo Alto, Calif.

[21] Appl. No.: 889,683

[22] Filed: May 27, 1992

[51] Int. Cl.⁶ .............................. G06F 7/06; G06F 7/00
[52] U.S. Cl. .................................. 395/800; 340/146.2;
  364/710.08; 364/715.01; 364/259; 364/259.1;
  364/259.2; 364/DIG. 1; 364/947; 364/947.1;
  364/947.2
[58] Field of Search ...................... 395/800; 340/146.2;
  364/715.01, 716, 717.5, 710.08

[56] References Cited

U.S. PATENT DOCUMENTS

| | | | |
|---|---|---|---|
| 3,906,459 | 9/1975 | Desmonds et al. | 340/172.5 |
| 4,160,290 | 7/1979 | Armstrong | 364/716 |
| 4,520,439 | 5/1985 | Liepa | 364/200 |
| 4,520,456 | 5/1985 | Miranker et al. | 395/800 |
| 4,569,016 | 2/1986 | Hao et al. | 364/200 |
| 4,760,517 | 7/1988 | Miller et al. | 364/200 |
| 4,903,228 | 2/1990 | Gregoire et al. | 364/900 |
| 5,111,415 | 5/1992 | Shackleford | 364/715.04 |
| 5,179,712 | 1/1993 | Abboud | 395/800 |
| 5,222,243 | 6/1993 | Briggs et al. | 395/800 |
| 5,274,835 | 12/1993 | Wakatani | 395/800 |

FOREIGN PATENT DOCUMENTS

2913899  4/1978  Germany .

Primary Examiner—Thomas G. Black
Assistant Examiner—Paul Harrity
Attorney, Agent, or Firm—Peter P. Tong

[57] ABSTRACT

A field compositor, with a regular and systematic structure, that merges fields of data together to compose new data words. Starting from a basic cell, the field compositor merges longer words by connecting more of the basic cells together in a systematic and orderly fashion. The cells are connected in a regular structure so that routing data through the compositor can be done in a similarly regular manner. The basic cell of a one-dimensional regular array has three control inputs to control two outputs, one being a data output; depending on the logic levels presented to the three inputs, data from the first or the second set of data are selected to be the data output of the cell. The basic cell of a two-dimension regular array has five control inputs and two outputs, one being a data output; depending on the logic levels of the five control inputs, data from the first or the second set of data are selected to be the data output of the cell. To reduce the time required to compose a word, a maintain-selection-lookahead-module provides input control signals for the initial cell of each row of the two-dimension regular array.

13 Claims, 18 Drawing Sheets

| $M_i$ | $B_i$ | $E_i$ | | $M_{i+1}$ | $C_i$ |
|---|---|---|---|---|---|
| 0 | 0 | 0 | | 0 | $a_i$ |
| 0 | 1 | 0 | | 1 | $b_i$ |
| 1 | 0 | 0 | | 1 | $\bar{b}_i$ |
| 1 | 0 | 1 | | 0 | $\bar{b}_i$ |
| 0 | 1 | 1 | | 0 | $b_i$ |
| 1 | 1 | 1 | | 1 | $a_i$ |
| 0 | 0 | 1 | | 1 | $\bar{a}_i$ |
| 1 | 1 | 0 | | 0 | $\bar{a}_i$ |

FIG 5

| | $M_i$ | $B_{ai}$ | $B_{bi}$ | | $M_{i+1}$ | $C_i$ |
|---|---|---|---|---|---|---|
| | 0 | 0 | 0 | | 0 | $a_i$ |
| | 0 | 0 | 1 | | 1 | $\overline{b_i}$ |
| | 1 | 0 | 0 | | 1 | $\overline{b_i}$ |
| | 1 | 1 | 0 | | 0 | $a_i$ |
| | 0 | 1 | 1 | | 0 | $\overline{a_i}$ |
| | 1 | 1 | 1 | | 1 | $b_i$ |
| | 0 | 1 | 0 | | 1 | $\overline{b_i}$ |
| | 1 | 0 | 1 | | 0 | $\overline{a_i}$ |

FIG 10

COMPOSITOR

| $M_i$ | $B_{ri}*B_{ci}$ $=B_i$ | $E_{ri}*E_{ci}$ $=E_i$ | | $M_{i+1}$ | $C_i$ |
|---|---|---|---|---|---|
| 0 | 0 | 0 | | 0 | $\bar{a}_i$ |
| 0 | 1 | 0 | | 1 | $\bar{b}_i$ |
| 1 | 0 | 0 | | 1 | $b_i$ |
| 1 | 0 | 1 | | 0 | $\bar{b}_i$ |
| 0 | 1 | 1 | | 0 | $b_i$ |
| 1 | 1 | 1 | | 1 | $a_i$ |
| 0 | 0 | 1 | | 1 | $a_i$ |
| 1 | 1 | 0 | | 0 | $\bar{a}_i$ |

FIG 14

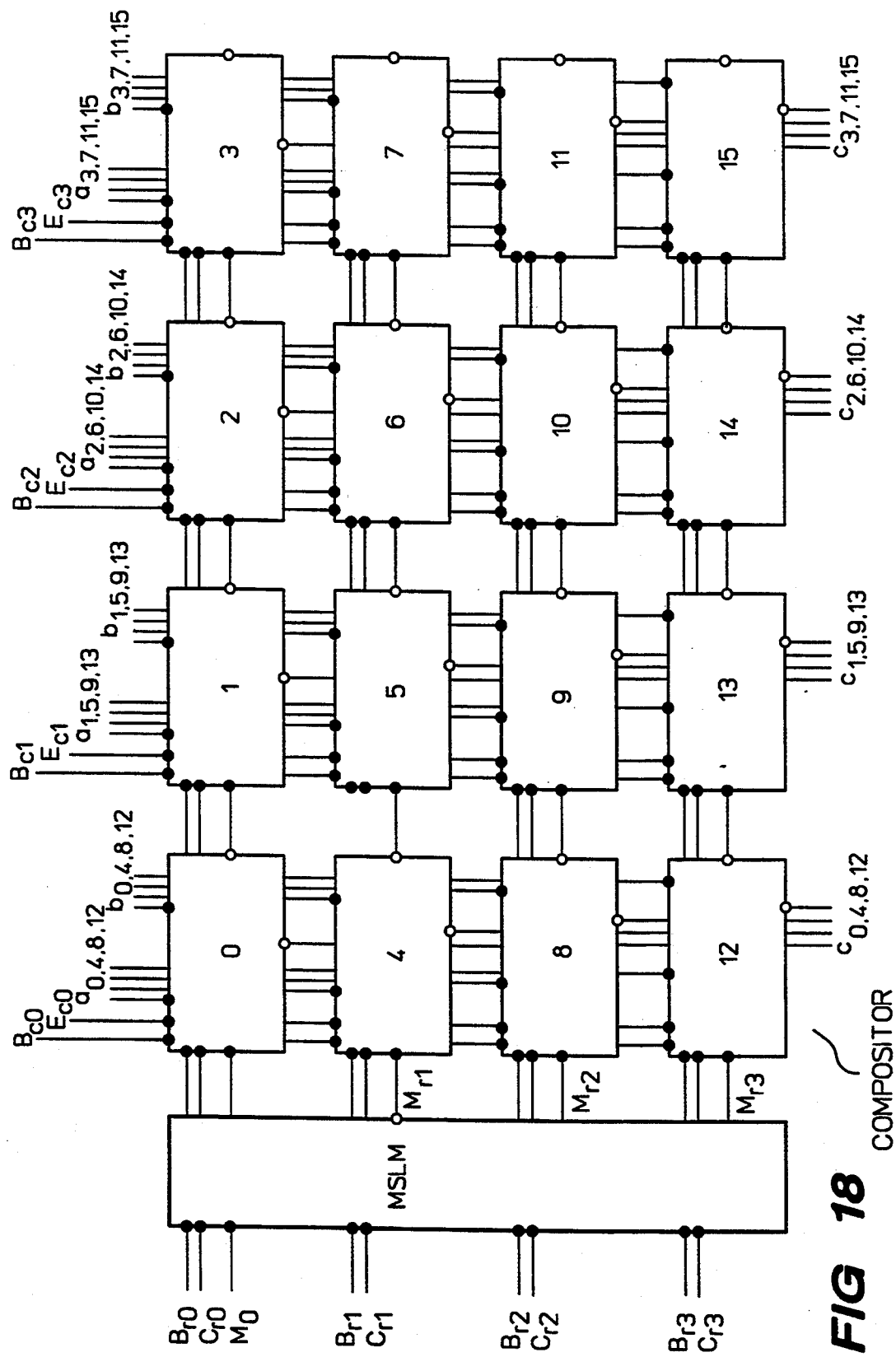
FIG 18 COMPOSITOR

FIELD COMPOSITOR FOR MERGING DATA AND INCLUDING CELLS EACH RECEIVING THREE CONTROL AND TWO DATA INPUTS AND GENERATING ONE CONTROL AND ONE DATA OUTPUT THEREFROM

BACKGROUND OF THE INVENTION

The present invention relates generally to a data processing system and more particularly to a field compositor, a data processing circuit for merging fields of data.

As shown in FIG. 1, a field compositor selects a field F in a word B and merges the selected field F into a word A to compose a word C.

Various devices have been used as field compositors. FIG. 2 depicts the function of a prior art device which requires an intermediate storage element I with at least the size of the selected field F. The field F selected from a word B is temporarily stored in the intermediate storage element I. Then, the selected field F is merged into the word A to form the word C. As the sizes of the word A and the selected field F increase, the complexity of the circuitry increases significantly because of the need for routing the data from the word B to the intermediate storage element I and then from the intermediate storage element I and the word A to the word C. A larger selected field F also requires extra storage space for the intermediate storage element I.

Another prior art method implementing a field compositor requires an intermediate storage element having the same size as the composed word. The intermediate storage element stores a pre-determined binary word where the locations of the 1s (ones) define the field selected from the first word to be merged with the second word. FIG. 3 illustrates the method. The pre-determined word I is ANDed with the first word A while the complement of the pre-determined word is ANDed with the second word B. The results of the two ANDed operations are ORed together to form the combined word C. Again as the size of the combined word C increases, not only does the pre-determined word I require extra storage space, but also the complexity of the circuitry increases significantly due to the need for generating the pre-determined word and routing the pre-determined word and its complement to different locations to form the combined word.

Various devices that can be used as field compositors have been known for a number of years, and by way of example, several forms of such devices can be found in the following U.S. Patents.

U.S. Pat. No. 4,903,228, by D. G. Gregoire et al., entitled "Single Cycle Merge/Logic Unit" discloses a merge operation within a single machine cycle with an intermediate storage element.

U.S. Pat. No. 4,520,439, by A. E. Liepa, entitled "Variable Field Partial Write Data merge" discloses a writing operation where the length of the selected field to be written could vary from a single bit to the extent of writing a full memory word. The operation uses a pre-determined word to protect the bit positions that are not included in the selected field.

U.S. Pat. No. 4,569,016, by H. T. Hao et al., entitled "Mechanism For Implementing One Machine Cycle Executable Mask And Rotate Instructions In A Primitive Instruction Set Computing System" discloses performing a multitude of computer operations including rotating, masking and merging within one machine cycle by ring shifting under the control of a pre-determined word.

U.S. Pat. No. 3,906,459, by D. J. Desmonds et al., entitled "Binary Data Manipulation Network Having Multiple Function Capability For Computers" discloses a network to manipulate binary data using word pre-determination and merge operations to combine two operands.

U.S. Pat. No. 4,760,517, by M. J. Miller et al., entitled "Thirty-Two Bit, Bit Slice Processor" discloses a 32-bit processor executing single cycle complex operations such as merging data with a pre-determined word generator.

Field compositors have been used for genetic algorithm machines. A general discussion of Genetic Algorithms can be found in Goldberg, *Genetic Algorithms in Search, Optimization, and Machine Learning.*

There is a need for a field compositor that can merge words without the need for generating and storing any pre-determined word that depends on the size of the selected field F to be merged or the size of the combined word itself. There is also a need for a field compositor that can be implemented in a systematic and orderly fashion using a regular structure so that as the size of the compositor increases, the complexity of the circuit will not increase correspondingly.

SUMMARY OF THE INVENTION

The present invention provides a field compositor, with a regular and systematic structure, that merges data efficiently to compose a new piece of data. The field compositor does not need to generate and store any pre-determined word that depends on the size of the selected field F to be merged or the size of the combined word. Starting from a basic cell, the field compositor is implemented by connecting as many basic cells together as there are data in the words to be merged. This provides a very regular structure which makes it possible to route data through the compositor in a regular manner without any need to increase the complexity of the circuit as the number of bits is increased. The field composition not only requires less space in memory than most prior art field compositors, but, due to its repetitive nature in formation, is exceptionally suitable for implementation using integrated circuit technology.

A field compositor according to a first embodiment of the invention composes a word by selecting data either from a first or a second set of data based on the logic levels of three different sets of input control signals, namely, a maintain-selection-input signal, a plurality of begin-selection-input signals and a plurality of end-selection-input signals. The compositor has an initial basic cell with five input nodes and two output nodes: a maintain-selection-input node for receiving the maintain-selection-input signal, a begin-selection-input node for receiving a first one of the begin-selection-input signals, an end-selection-input node for receiving a first one of the end-selection-input signals, a first-data-input node for receiving an initial data in the first set of data, a second-data-input node for receiving an initial data in the second set of data, a maintain-selection-output node, and a selected-output node.

The cell is operative to produce two output signals, a maintain-selection-output signal and a selected-output signal.

If the begin-selection-input signal is of the same logic level as the end-selection-input signal, then the maintain-selection-output signal is of the same logic level as the signal provided at the maintain-selection-input node, otherwise the maintain-selection-output signal is of the opposite logic level as the signal provided at the maintain-selection-input node.

If the signal provided at the maintain-selection-input node is of the same logic level as the begin-selection-input signal, the selected-output signal is determined by the data provided at the first-data-input node, otherwise, the selected-output signal is determined by the data provided at the second-data-input node.

The compositor can compose a word of any desired size by means of a plurality of systematically-cascaded basic cells, each having a structure similar to that of the initial basic cell, arranged in a linear array. The linear array is formed by having the maintain-selection-input node of each cell after the initial cell connected to the maintain-selection-output node of the immediately preceding cell. The first-data-input nodes of successive cells are connected to receive the successive data in the first set of data, and similarly the second-data-input nodes are connected to receive the successive data in the second set of data.

Through the logic levels of the begin-selection-input signals, the end-selection-input signals, and the maintain-selection-input signal, data from the first set of data or the second set of data are selected to provide the composed word at the selected-output nodes.

In the first embodiment, with the first and the second sets of data as binary bits, the basic cell can be simply implemented with only two EXCLUSIVE-OR gates, one INVERTER, two AND gates and one OR gate.

The second preferred embodiment of the present invention is similar to the first except that the structure of the basic cell is different so as to generate the signal on the maintain-selection-output node by "EXCLUSIVE-OR"ing the signal on the maintain-selection-input node only once, thereby reducing the propagation time of the maintain-selection-input signal and enabling the circuit to provide the output word more quickly.

The third preferred embodiment of the present invention is similar to the first preferred embodiment except the basic cell is adapted for building a two-dimension array. The begin-selection-input signal is determined by the output of ANDing a begin-row-selection-input signal and a begin-column-selection-input signal; similarly, the end-selection-input signal is determined by the output of ANDing an end-row-selection-input signal and an end-column-selection-input signal. The maintain-selection-input of the initial cell in the second row is connected to the maintain-selection-output of the last cell in the first row and so on. Alternatively, to reduce the time required to compose a word, a Maintain-Selection-Lookahead-Module provides all the signals provided at the maintain-selection-input nodes for the initial cells of all the rows.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 5 shows the logic table of the operation of the basic cell in FIG. 4.

FIG. 10 shows the logic table of the operation of the basic cell in FIG. 9.

FIG. 14 shows the logic table of the operation of the basic cell in FIG. 13.

FIG. 18 shows a 4 by 4 two-dimension array of basic cells of the kind shown in FIG. 13 with a Maintain-Selection-Lookahead-Module.

DESCRIPTION OF THE PREFERRED EMBODIMENT

As shown in the exemplary drawings for purposes of illustration, the invention uses a regular and systematic structure to provide a field compositor that merges data very efficiently. The prior art field compositors require generating, storing, and routing a pre-determined word of size at least similar to the field to be merged by complex and irregular circuitry.

In accordance with the invention, the field compositor requires less memory space and less complex circuitry than prior art devices. The present invention merges words to form a composed word without the need for generating and storing any pre-determined word that depends on the size of the selected field to be merged or the size of the combined word. The present invention is based on a basic cell to achieve the composition; a bigger composed word is obtained simply by connecting together more basic cells in a very regular structure. The routing problem is significantly reduced and the structure is easily implemented in integrated circuit technology.

Figure 1:
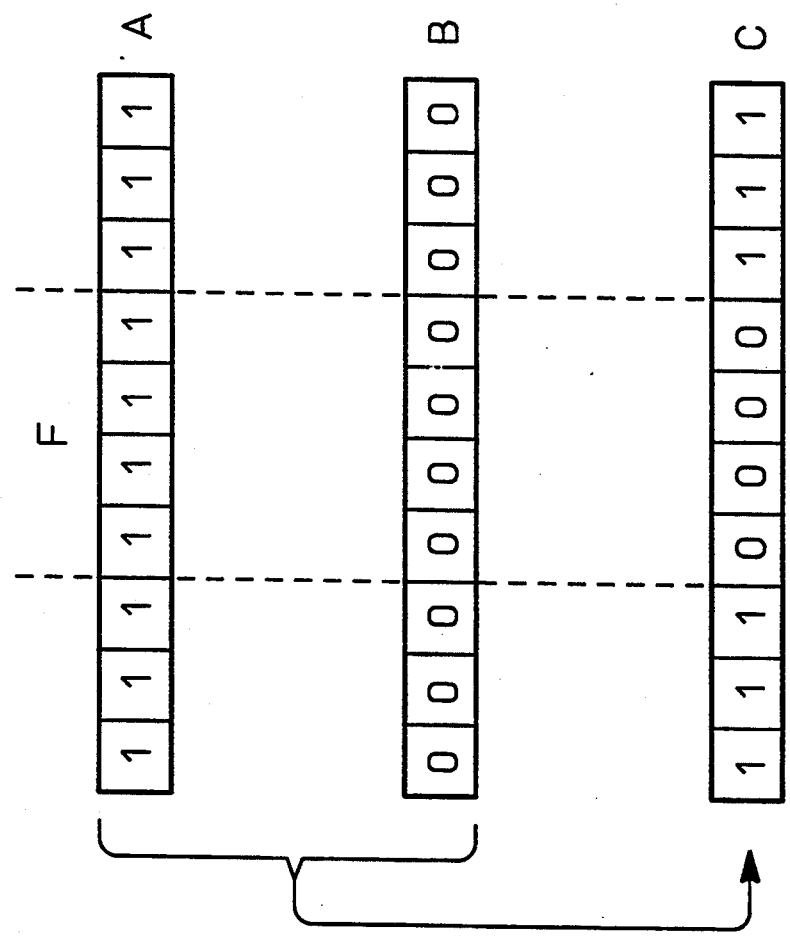
FIG. 1 shows the function performed by a field compositor.
Figure 2:
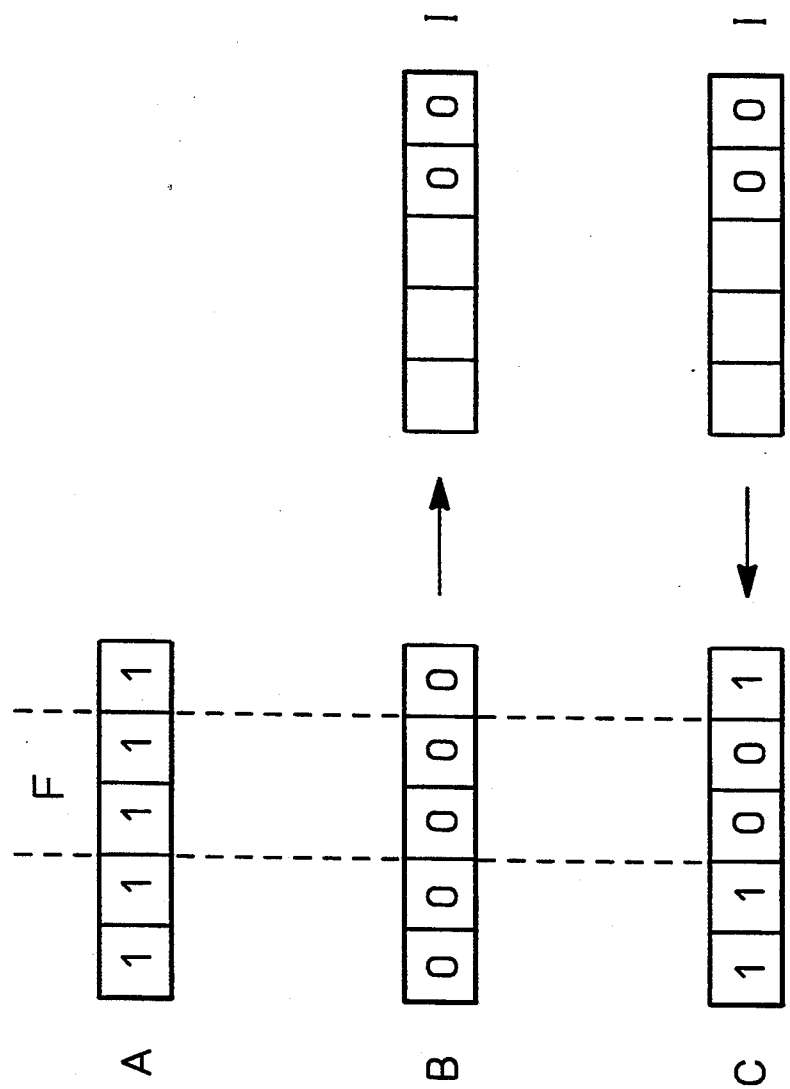
FIG. 2 shows the function of a prior art field compositor that needs an intermediate storage element I.
Figure 3:
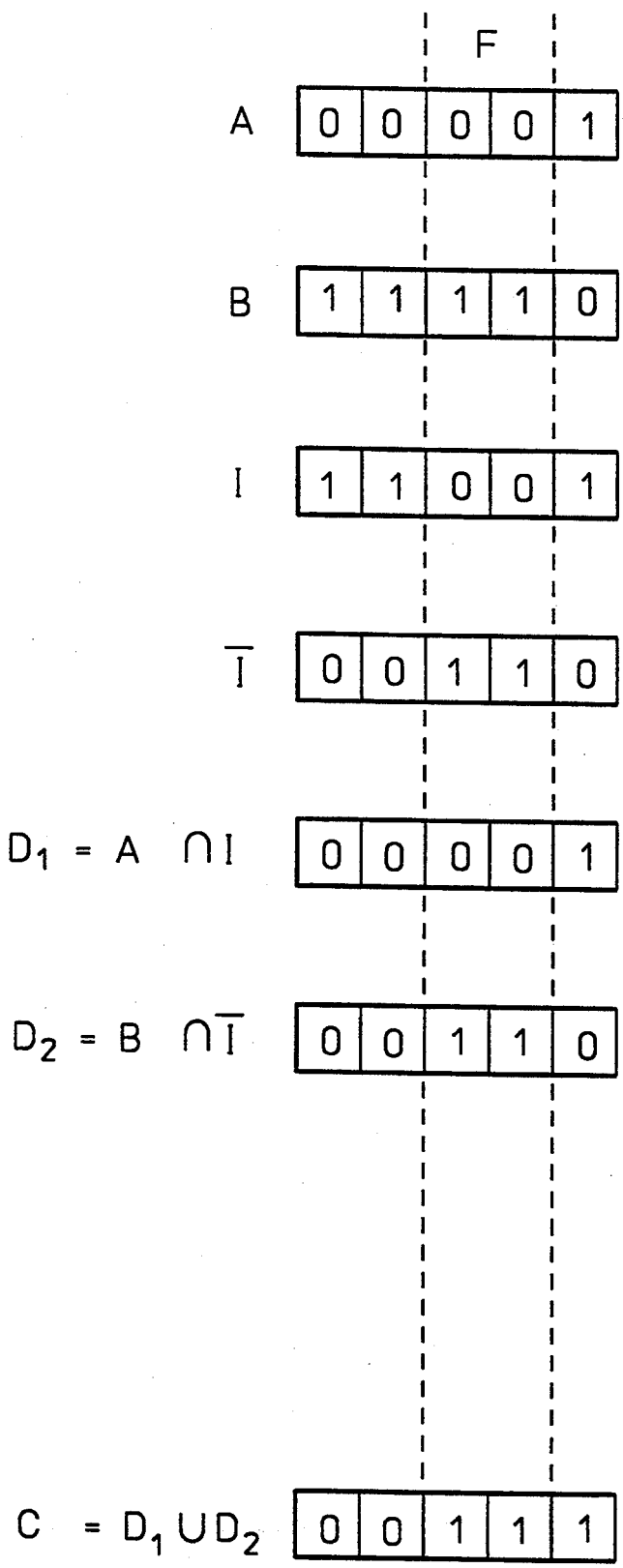
FIG. 3 shows the function of a prior art field compositor that needs a pre-determined word and its complement.
Figure 4:
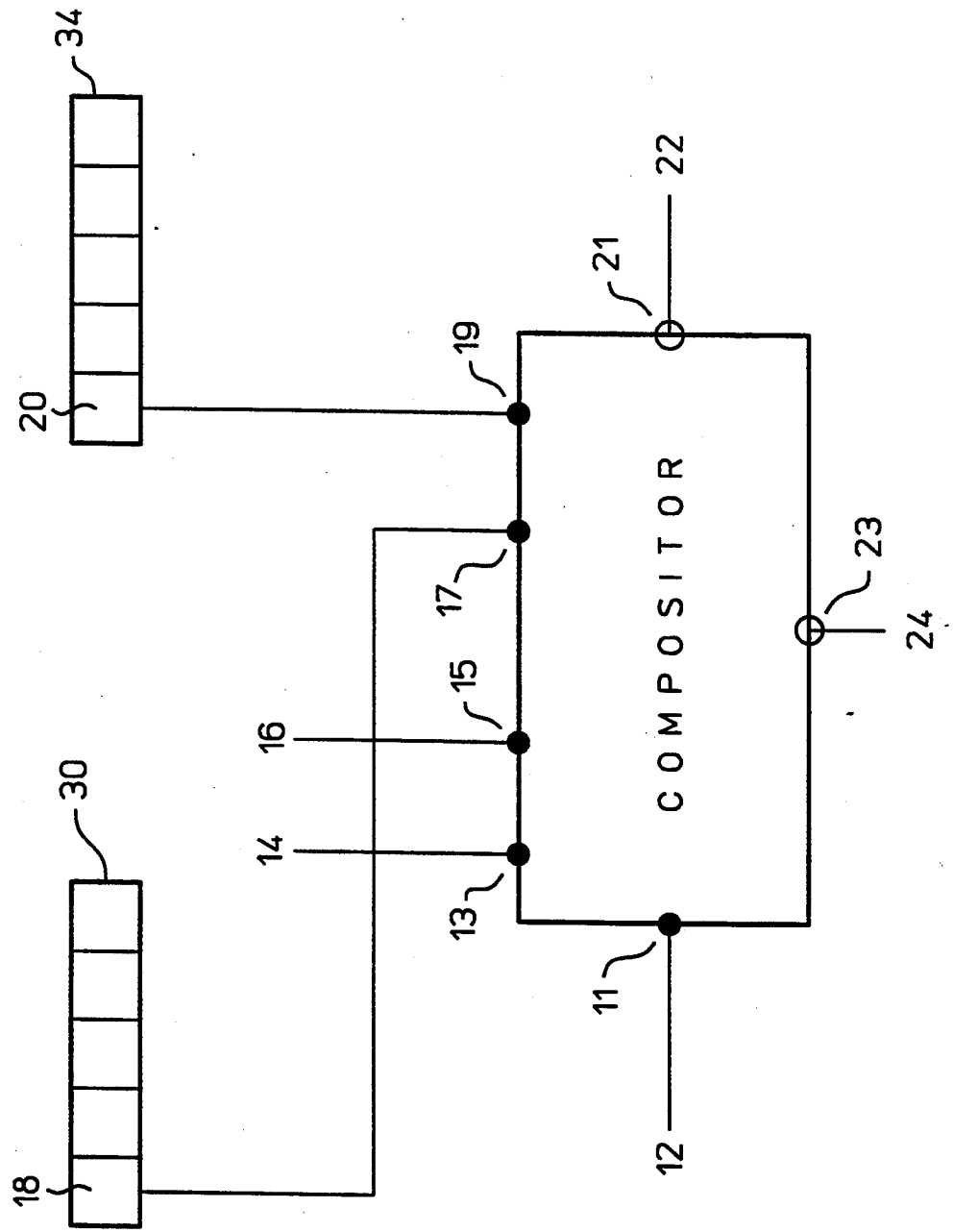
FIG. 4 shows a basic cell of the first preferred embodiment of the present invention.

FIG. 4 shows a first preferred embodiment of a field compositor according to the invention. The field compositor composes a word by selecting data either from a first or a second set of data. The selection is based on the logic levels of three different sets of input control signals, namely, a maintain-selection-input signal, a plurality of begin-selection-input signals and a plurality of end-selection-input signals. For a binary system, a logic level is either high or low.

The central structure of the compositor is an initial basic cell 10 which has five input nodes and two output nodes, with a solid dot on the boundary of the cell symbolizing an input node and an empty dot symbolizing an output node. A line touching a cell but without any solid or empty dot means that the line just passes through the cell. The five input nodes are a maintain-selection-input node 11 for receiving the maintain-selection-input signal 12, a begin-selection-input node 13 for receiving a first one of the begin-selection-input signals 14, an end-selection-input node 15 for receiving a first one of the end-selection-input signals 16, a first-data-input node 17 for receiving an initial data 18 in a first set of data 30, a second-data-input node 19 for receiving an initial data 20 in a second set of data 34. The two output nodes are a maintain-selection-output node 21 and a selected-output node 23.

The cell 10 produces two output signals: a maintain-selection-output signal 22 and a selected-output signal 24, such that the maintain-selection-output signal 22 is provided at the maintain-selection-output node 21 and the selected-output signal 24 is provided at the selected-output node 23.

The logic level of the maintain-selection-output signal 22 depends on the logic levels of the begin-selection-input signal 14 and the end-selection-input signal 16. If the begin-selection-input signal 14 is of the same logic level as the end-selection-input signal 16, then the maintain-selection-output signal 22 is of the same logic level as the signal provided at the maintain-selection-input node 12, otherwise the maintain-selection-output signal 22 is of the opposite logic level as the signal provided at the maintain-selection-input node 12.

The selected-output signal 24 is either from the initial data 18 from the first set of data 30 or from the initial data 20 from the second set of data 34 depending on the logic levels of the signal provided at the maintain-selection-input node 12 and the begin-selection-input signal 14. If the signal provided at the maintain-selection-input node 12 is of the same logic level as the begin-selection-input signal 14, the selection output signal 24 is determined by the initial data 18 provided at the first-data-input node 17, otherwise, the selection output signal 24 is determined by the initial data 20 provided at the second-data-input node 19. FIG. 5 shows the logic table of the operation of the basic cell in FIG. 4.

Figure 6:
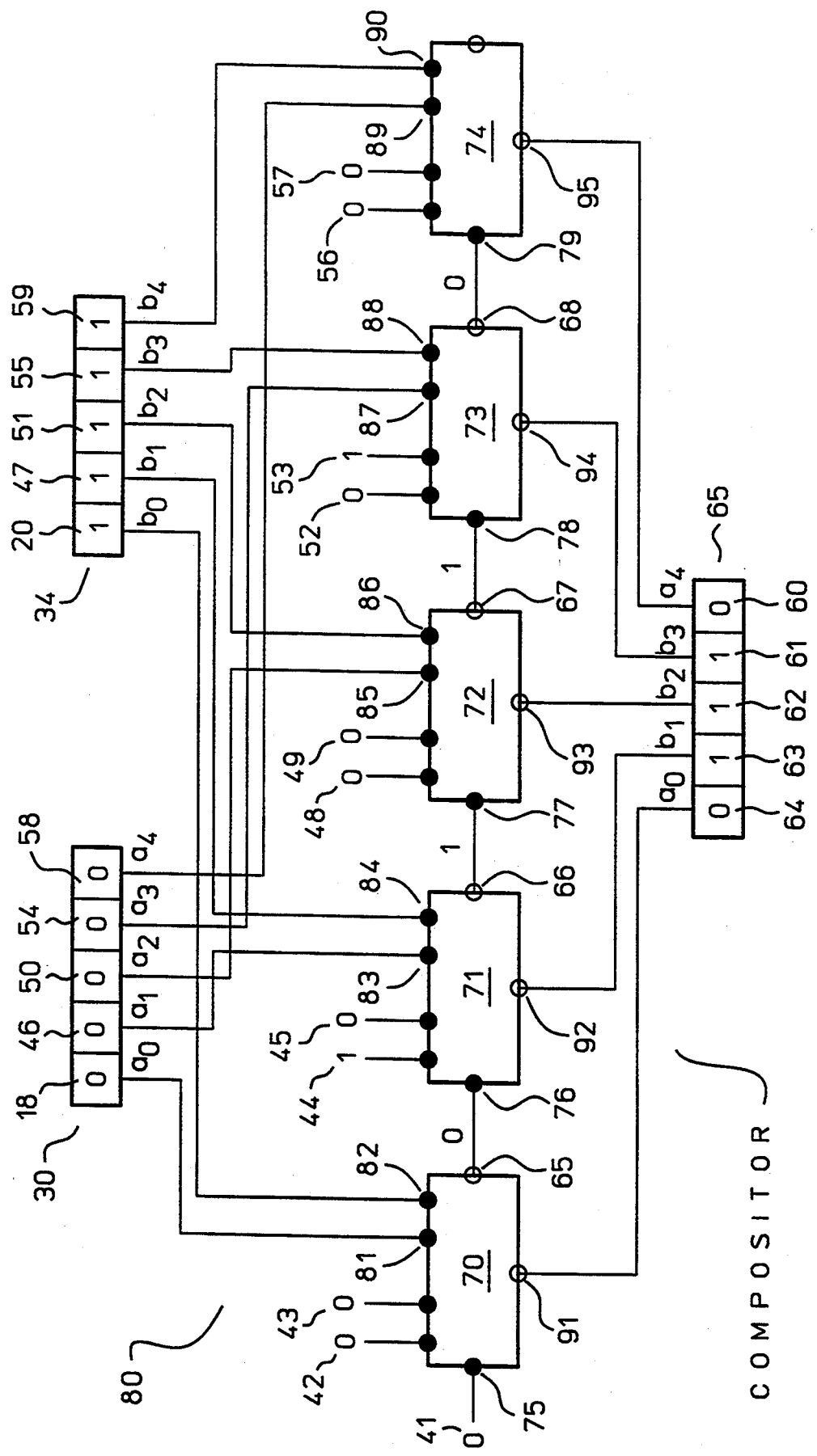
FIG. 6 shows a linear array of the basic cell in FIG. 4.

The compositor can compose word of any size by systematically cascading basic cells together. FIG. 6 shows an example of the composition for a word with five data. The compositor systematically cascades five basic cells 71, 72, 73, 74, and 75, to form a linear array 80; each basic cell has a structure similar to the initial basic cell 70. The compositor can compose a word of any size by having a linear array with more basic cells. The linear array 80 is formed by having the maintain-selection-input node of each cell after the initial cell connected to the maintain-selection-output node of the immediately preceding cell, such as the maintain-selection-input node 76 of the second cell 71 connected to the maintain-selection-output node 65 of the immediately preceding cell, the first cell 70. The first-data-input nodes of successive cells receive the successive data in the first set of data, such as the first-data-input node 83 of the second cell 71 receives the successive data 46 in the first set of data 30 after the data 18 received by the immediately preceding cell, the initial cell 70; similarly the second-data-input nodes of successive cells receive the consecutive data in the second set of data, such as the second-data-input node 84 of the second cell 71 receives the successive data 47 in the second set of data 34 after the data 20 received by the immediately preceding cell, the initial cell 70.

Through the logic levels in the plurality of begin-selection-input signals 42, 44, 48, 52, and 56; the plurality of end-selection-input signals 43, 45, 49, 53, and 57; and the plurality of signal provided at the maintain-selection-input nodes 41, 76, 77, 78, and 79 coupled to the cells 70, 71, 72, 73, and 74, data 18, 46, 50, 54, and 58 from the first set of data 30 or data 20, 47, 51, 55, and 59 from the second set of delta 34 are selected to provide outputs at the selected-output nodes 91, 92, 93, 94, and 95 to compose the word 65.

The first four rows of logic levels in FIG. 5 describe the operations of the linear array of basic cells in FIG. 6 with the particular input signal levels shown, where for each cell, $M_i$ denotes the signal provided at the maintain-selection-input node, $M_{i+1}$ denotes the maintain-selection-output signal which is also the signal provided at the maintain-selection-input node of the subsequent cell, $B_i$ the begin-selection-input signal, $E_i$ the end-selection-input signal, $a_i$ the data from the first set of data, $b_i$ the data from the second set of data.

The first row describes the initial cell 70 as depicted in FIG. 6. All three selection input signals 41, 42, and 43 are at a LOW logic level. This results in the value of the first data $a_0$, which is applied to the first data input 81, to be coupled to the selected-output node 91. It also results in $M_1$ being a LOW logic level which is provided at the maintain-selection-output node 65.

The second row describes the next cell 71. The LOW logic level $M_1$ from the node 65 of the previous cell 70 is coupled to the maintain-selection-input node 76 of the cell 71. $B_1$, 44 is at a HIGH logic level and $E_1$, 45 is at a LOW logic level. This results in the value of the second data $b_1$, which is applied to the second data input 84, being coupled to the selected-output node 92. It also results in $M_2$ being a HIGH logic value which is presented at the maintain-selection-output node 66.

The third row describes the next cell 72. The HIGH logic level $M_2$ from the node 66 of the previous cell 71 is coupled to the maintain-selection-input node 77 of the cell 72. $B_2$, 48 is at a LOW logic level and $E_2$, 49 is also at a LOW logic level. This results in the value of the second data $b_2$, which is applied to the second data input 86, being coupled to the selected-output node 93. It also results in $M_3$ being a HIGH logic value which is presented at the maintain-selection-output node 67.

The fourth row describes the next cell 73. The HIGH logic level $M_3$ from the node 67 of the previous cell 72 is coupled to the maintain-selection-input node 78 of the cell 73. $B_3$, 52 is at a LOW logic level and $E_3$, 53 is at a HIGH logic level. This results in the value of the second data $b_3$, which is applied to the second data input 88, being coupled to the selected-output node 94. It also results $M_4$ being a LOW logic value which is presented at the maintain-selection-output node 68.

The control signals presented at the various control inputs of the next cell 74 have the same values as the signals presented to the first cell 70. Accordingly, the first data $a_4$, which is applied to the first data input 89 of the cell 74, is coupled to the selected-output node 95.

Thus, the settings of the various input control signals as described above have the effect of causing a field that comprises the middle three bits $b_1$, $b_2$, and $b_3$ of the second data word 34 being coupled into the first data word 30, as in the output data word 65. Particular logic values for the various input bits are shown (logic LOW or "0" values for all the bits of the first word, and logic HIGH or "1" values for all the bits of the second word) for illustrative purposes, but it will be apparent that any value possessed by a selected input data is what is being coupled to the corresponding output.

Also, in the embodiment as described and illustrated, the value of a selected input data is coupled to the output. In alternate embodiments, the value of the output might be determined by the value of the selected input in some other way; for example, the selected input value might be inverted or otherwise modified in the course of being used to determine the value of the output.

The composition of the word 65 can be performed in one operation (one clock cycle) without the need for any intermediate storage element. The field F, in the above example "111," is specified by its left and right boundaries rather than with an intermediate storage element. Furthermore, multiple fields from the second set of data can be extracted and combined into the first set of data at non-contiguous locations to generate a composed word.

The fifth and the sixth rows in the logic table in FIG. 5 describes the special case when both $B_i$ and $E_i$ are high. If $M_i$ is at a HIGH logic level, the cell will provide $b_i$ for the output selected node; if $M_i$ is at a LOW logic level, $a_i$ will be provided at the output selected[node. In both the fifth and the sixth rows, $M_{i+1}$ remains at the same logic level as $M_i$.

Row seventh describes the situation where $E_i$ is at a HIGH logic level and $B_i$ is at a LOW logic level; the cell will select data $a_i$ with $M_{i+1}$ set at a HIGH logic level. Thus, a random field can be selected from a set of data without regard to the fact that the index on $B_i$ is larger than the index on $E_i$. This is advantageous to a genetic algorithm machine where the process of crossover recombination could be implemented with the embodiment of the present invention and two independent random number generators, one connected to the begin-selection-input node, the other connected to the end-selection-input node. The design of the random number generators is greatly simplified and the speed of the computation is greatly enhanced because the index on the begin-selection-input does not have to be smaller than the index on the end-selection-input.

Row eighth describes the situation where $B_i$ is at a HIGH logic level and $E_i$ is at a LOW logic level while $M_i$ is at a HIGH logic level; the cell will select $a_i$ with $M_{i+1}$ set at a LOW logic level.

Figure 7A:
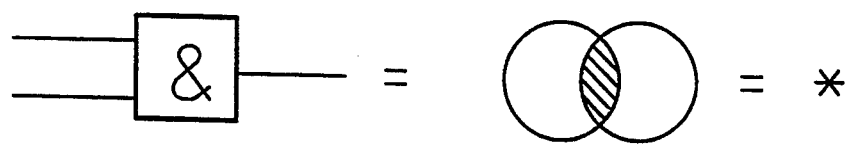
FIG. 7A-D show the IEEE Standard graphic symbols for selected logic functions.
Figure 7B:
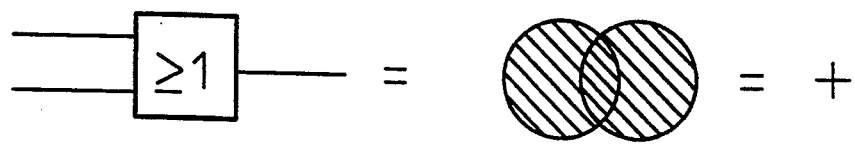
Figure 7C:
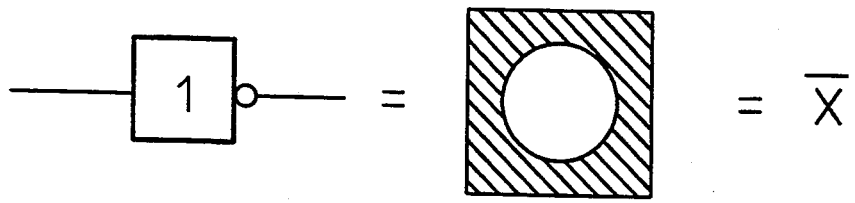
Figure 7D:
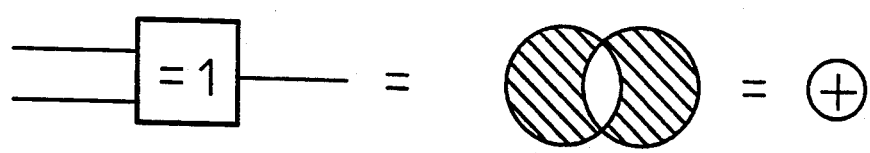

The basic cell can be implemented by standard logic gates. FIG. 7A–D show the IEEE Standard graphic symbols for the logic functions to be discussed. FIG. 7A is an "AND" gate; 7B is an "OR" gate; 7C is an "INVERTER"; and 7D is an "EXCLUSIVE-OR" gate.

Figure 8:
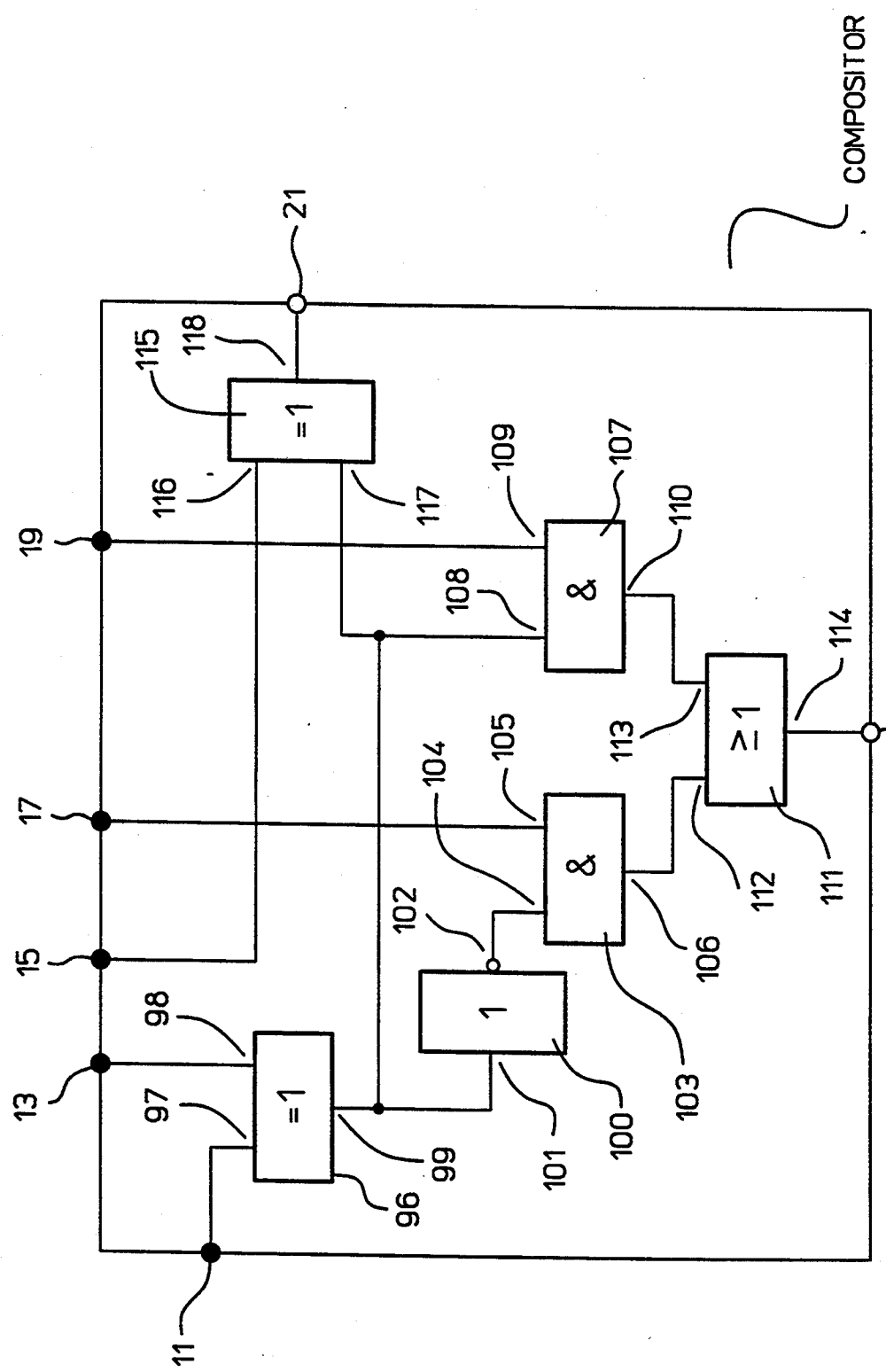
FIG. 8 shows the logic gates used to implement the basic cell in FIG. 4.

FIG. 8 shows one method of implementing the basic cell of the first preferred embodiment using logic gates, if the first 30 and the second 34 sets of data are binary signals. The basic cell consists of two EXCLUSIVE-OR gates, one INVERTER, two AND gates and one OR gate.

The first EXCLUSIVE-OR gate 96 with two inputs 97, 98, and one output, 99, has one of its inputs 97 connected to the maintain-selection-input node 11 and the other input 98 connected to the begin-selection-input node 13. The INVERTER 100, with an input 101 and an output 102, has the input 101 connected to the output 99 of the first EXCLUSIVE-OR gate 96. The first AND gate 103, with two inputs 104,105, and one output 106, has one of its inputs 104 connected to the output 102 of the INVERTER 100, and the other input 105 connected to the first-data-input node 17. The second AND gate 107, with two inputs 108, 109, and one output 110, has one of its inputs 108 connected to the output 99 of the first EXCLUSIVE-OR gate 96 and the other input 109 connected to the second-data-input node 19. The OR gate 111, with two inputs 112, 113, and one output 114, has one of its inputs 112 connected to the output 106 of the first AND gate 103 and its second input 113 connected to the output 110 of the second AND gate 107. The output 114 of the OR gate 111 is connected to the selected-output node 23. The second EXCLUSIVE-OR gate 115, with two inputs 116, 117, and one output 118, has one input 116 connected to the end-selection-input node 15, and the other input 117 connected to the output 99 of the first EXCLUSIVE-OR gate 96. The output 118 of the second EXCLUSIVE-OR gate 115 is connected to the maintain-selection-output node 21. Note that the signal on the maintain-selection-output node 21 depends on "EXCLUSIVE-OR"ing the signal on the maintain-election-input node 11 two times.

Figure 9:
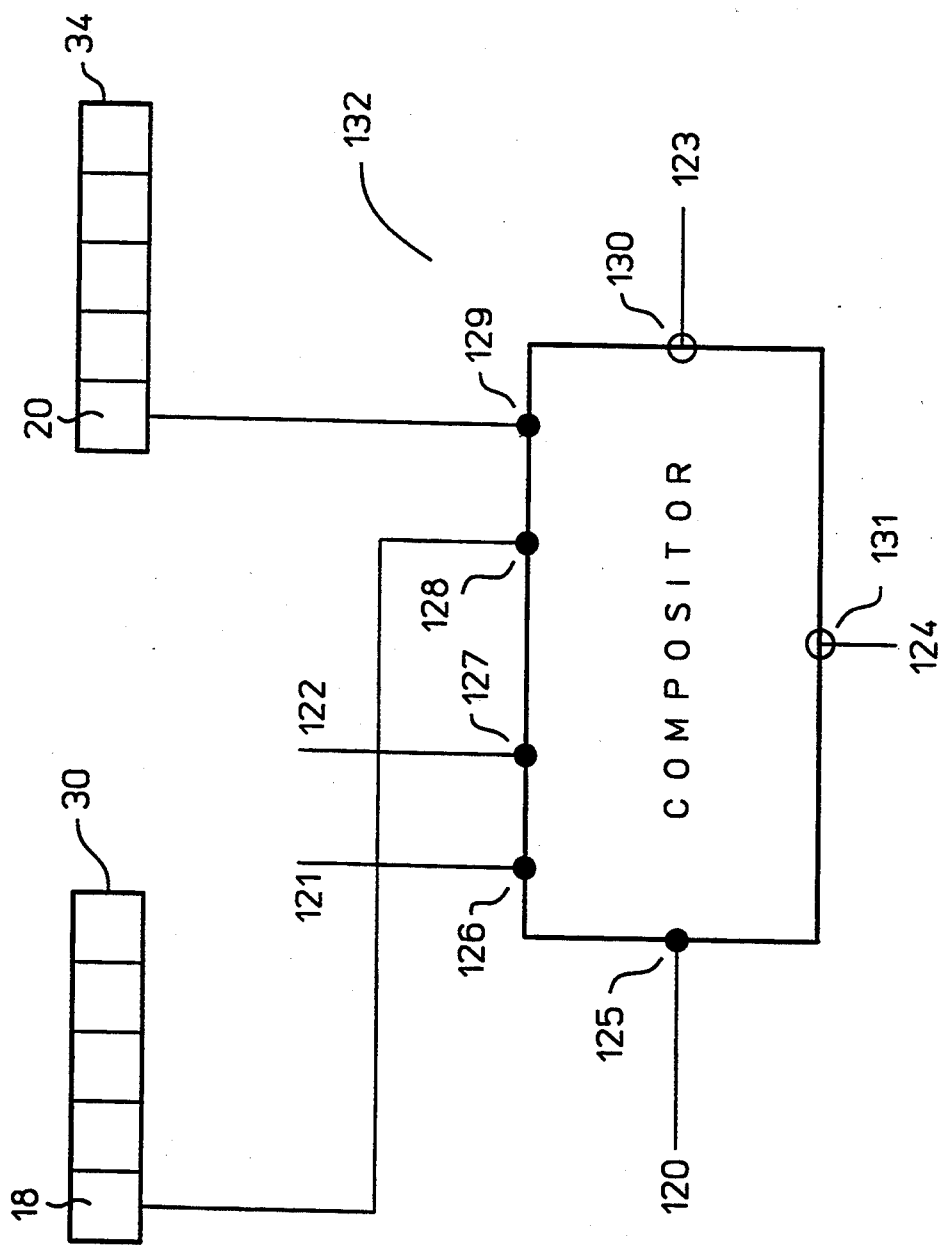
FIG. 9 shows a basic cell of the second preferred embodiment of the present invention.

FIG. 9 shows a second preferred embodiment of a field compositor according to the invention. The second preferred embodiment of the present invention is similar to the first preferred embodiment except that the structure of the basic cell is different in order to generate the signal on the maintain-selection-output node by "EXCLUSIVE-OR"ing only once the signal on the maintain-selection-input node. For an array of basic cells, the maintain-selection-input signal of the initial cell must propagate through all the cells in order to generate the selected-output signal of the last cell. Requiring only one "EXCLUSIVE-OR" operation to generate the maintain-selection-output signal from the signal provided at the maintain-selection-input node for each cell reduces the time delay of their propagation and enables the circuit to provide the output word more quickly.

In the second preferred embodiment, the field compositor again composes a word by selecting data either from a first or a second set of data. The selection is based on the logic levels of three different sets of input control signals, namely, a maintain-selection-input signal, a plurality of first-selection-input signals and a plurality of second-selection-input signals.

The central structure of this embodiment of the compositor is an initial basic cell 132 which has five input nodes and two output nodes. The five input nodes are a maintain-selection-input node 125 for receiving the maintain-selection-input signal 120, a first-selection-input node 126 for receiving a first one of the begin-selection-input signals 121, a second-selection-input node 122 for receiving a first one of the second-selection-input signals 122, a first-data-input node 128 for receiving an initial data 18 in a first set of data 30, a second-data-input node 129 for receiving an initial data 20 in a second set of data 34. The two output nodes are a maintain-selection-output node 130 and a selected-output node 131.

The cell 132 produces two output signals, a maintain-selection-output signal 123 and a selected-output signal 124. The maintain-selection-output signal 123 is provided at the maintain-selection-output node 130 and the selected-output signal 124 is provided at the selected-output node 131.

The logic level of the maintain-selection-output signal 123 depends on the logic levels of the first-selection-input signal 121 and the second-selection-input signal 122. If the first-selection-input signal 121 has the same logic level as the second-selection-input signal 122 then the maintain-selection-output signal 123 is of the same logic level as the maintain-selection-input signal 120; otherwise, the maintain-selection-output signal 123 is of the opposite logic level as the maintain-selection-input signal 120.

The selected-output signal 124, provided at the selected-output node 131, is selected either from the initial data 18 from the first set of data 30 or from the initial data 20 from the second set of data 34, depending on the logic levels of the maintain-selection-input signal 120, the first-selection-input signal 121, and the second-selection-input signal 122. The selected-output signal 124 is determined by the initial data 18 of the first set of data 30 provided at the first-data-input node 128 if an even number of input control signals from the group of maintain-selection-input signal 120, first-selection-input signal 121 and second-selection-input signal 122 are at a high level (zero is considered as an even number). But, if an odd number of input control signals from the group of maintain-selection-input signal 120, first-selection-input signal 121 and second-selection-input signal 122 are at a high level, then the selected-output signal 124 is determined by the initial data 20 of the second set of data 34 provided at the second-data-input node 129. FIG. 10 shows the logic table of the operation of the basic cell in FIG. 9.

Figure 11:
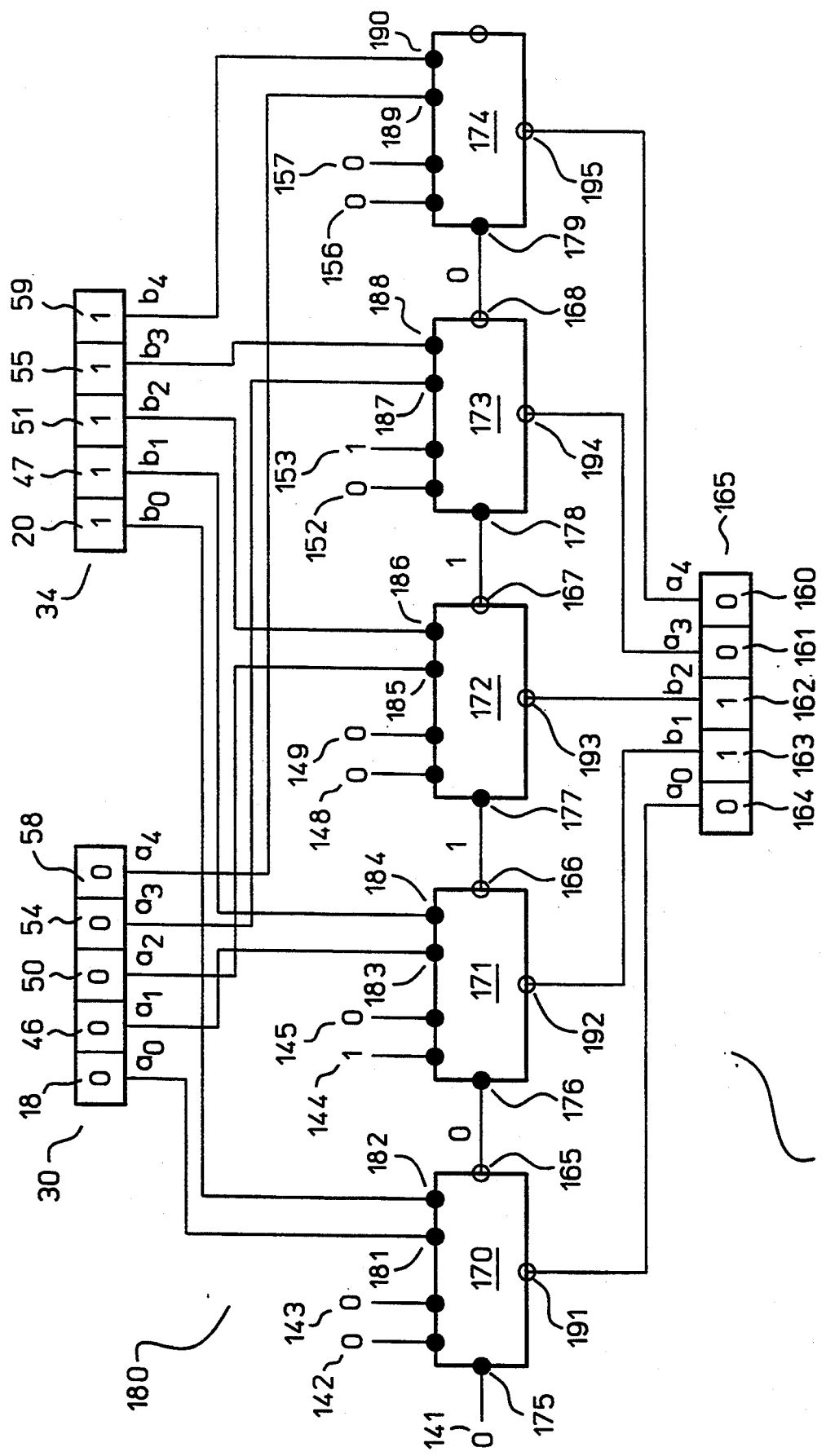
FIG. 11 shows a linear array of basic cells of the kind shown in FIG. 9.

The compositor can compose word of any size by systematically cascading basic cells together. FIG. 11 shows an example of the composition for a word with five data. The compositor systematically cascades five basic cells 170, 171, 172, 173, and 174 to form a linear array 180; each basic cell has a structure similar to the initial basic cell 170. The compositor can compose a word of any size by having more basic cells in the linear array. The linear array 180 is formed by having the maintain-selection-input node of each cell after the initial basic cell 170 connected to the maintain-selection-output node of the immediately preceding cell, such as the maintain-selection-input node 176 of the second cell 171 connected to the maintain-selection-output node 165 of the initial cell 170. The first-data-input nodes of successive cells receive the successive data from the first set of data, such as the first-data-input node 183 of the second cell 171 receives the successive data 46 in the first set of data 30 after the data 18 received by the initial cell 170; similarly the second-data-input nodes of successive cells receive successive data from the second set of data, such as the second-data-input node 184 of the second cell 171 receives the successive data 47 in the second set of data 34 after the data 20 received by the initial cell 170.

Through the logic levels in the plurality of first-selection-input signals 142, 144, 148, 152, and 156; the plurality of the second-selection-input signals 143, 145, 149, 153, and 157; and the plurality of signal provided at the maintain-selection-input nodes 141, 176, 177, 178, and 179 provided for the cells 170, 171, 172, 173, and 174, data 18, 46, 50, 54, and 58 from the first set of data 30 or data 20, 47, 51, 55, and 59 from the second set of data 34 are selected to provide outputs at the selected-output nodes 191, 192, 193, 194, and 195 to compose the word 165.

The first four rows of logic levels in FIG. 10 describe the operations of the linear array of basic cells in FIG. 11 with the particular input signal levels shown, where for each cell, $M_i$ denotes the signal provided at the maintain-selection-input node, $M_{i+1}$ denotes both the maintain-selection-output signal of the cell and the signal provided at the maintain-selection-input node of the subsequent cell, $B_{ai}$ the first-selection-input signal, $B_{bi}$ the second-selection-input signal, $a_i$ the data from the first set of data, $b_i$ the data from the second set of data, and $c_i$ the selected-output signal.

The first row describes the initial cell 170 as depicted in FIG. 11. All three selection input signals 141, 142, and 143 are at a LOW logic level. This results in the value of the first data $a_0$, which is applied to the first data input 181, to be coupled to the selected-output node 191. It also results in $M_1$ being a LOW logic level which is provided at the maintain-selection-output node 165.

The second row describes the next cell 171. The LOW logic level $M_1$ from the node 165 of the previous cell 170 is coupled to the maintain-selection-input node 176 of the cell 171. $B_{a1}$, 144 is at a LOW logic level and $B_{b1}$, 145 is at a HIGH logic level. This results in the value of the second data $b_1$, which is applied to the second data input 184, being coupled to the selected-output node 192. It also results in $M_2$ being a HIGH logic value which is presented at the maintain-selection-output node 166.

The third row describes the next cell 172. The HIGH logic level $M_2$ from the node 166 of the previous cell 171 is coupled to the maintain-selection-input node 177 of the cell 172. $B_{a2}$, 148 is at a LOW logic level and $B_{b2}$, 149 is also at a LOW logic level. This results in the value of the second data $b_2$, which is applied to the second data input 186, being coupled to the selected-output node 193. It also results in $M_3$ being a HIGH logic value which is presented at the maintain-selection-output node 167.

The fourth row describes the next cell 173. The HIGH logic level $M_3$ from the node 167 of the previous cell 172 is coupled to the maintain-selection-input node 178 of the cell 173. $B_{a3}$, 152 is at a HIGH logic level and $B_{b3}$, 153 is at a LOW logic level. This results in the value of the second data $b_3$, which is applied to the second data input 188, being coupled to the selected-output node 194. It also results $M_4$ being a LOW logic value which is presented at the maintain-selection-output node 168.

The control signals presented at the various control inputs of the next cell 174 have the same values as the signals presented to the first cell 170. Accordingly, the first data $a_4$, which is applied to the first data input 189 of the cell 174, is coupled to the selected-output node 195.

Thus, the settings of the various input control signals as described above have the effect of causing a field that comprises the middle two bits, $b_1$ and $b_2$, of the second data word 34 being coupled into the first data word 30, as in the output data word 165. Particular logic values for the various input bits are shown (logic LOW or "0" values for all the bits of the first word, and logic HIGH or "1" values for all the bits of the second word) for illustrative purposes, but it will be apparent that any value possessed by a selected input data is what is being coupled to the corresponding output.

Also, in the embodiment as described and illustrated, the value of a selected input data is coupled to the output. In alternate embodiments, the value of the output might be determined by the value of the selected input in some other way; for example, the selected input value might be inverted or otherwise modified in the course of being used to determine the value of the output.

The composition of the word 165 can be performed in one operation (one clock cycle) without the need for any intermediate storage element. The field F, in the above example "11," is specified by its left and right boundaries rather than with an intermediate storage element. Furthermore, multiple fields from the second set of data can be extracted and combined into the first set of data at non-contiguous locations to generate a composed word.

The fifth and the sixth rows in the logic table in FIG. 10 describes the special case when both $B_{ai}$ and $B_{bi}$ are at a High logic level. If $M_i$ is high, the cell will provide $b_i$ to the output selected node; if $M_i$ is low, $a_i$ will be provided to the output selected node. In both the fifth and the sixth rows, $M_{i+1}$ remains at the same level as $M_i$.

Row seven describes the situation where $B_{ai}$ is high and $B_{bi}$ is low; the cell will select bit $b_i$ with $M_{i+1}$ becoming high. Thus, a random field can be selected from a set of data without regard to the fact that the index on the $B_{ai}$ is larger than the index on $B_{bi}$. Again this is advantageous to a genetic algorithm machine as described above.

Row eight describes the situation where $B_{bi}$ is high and $B_{ai}$ is low while $M_i$ is high; the cell will select $a_i$ with $M_{i+1}$ becoming low.

Figure 12:
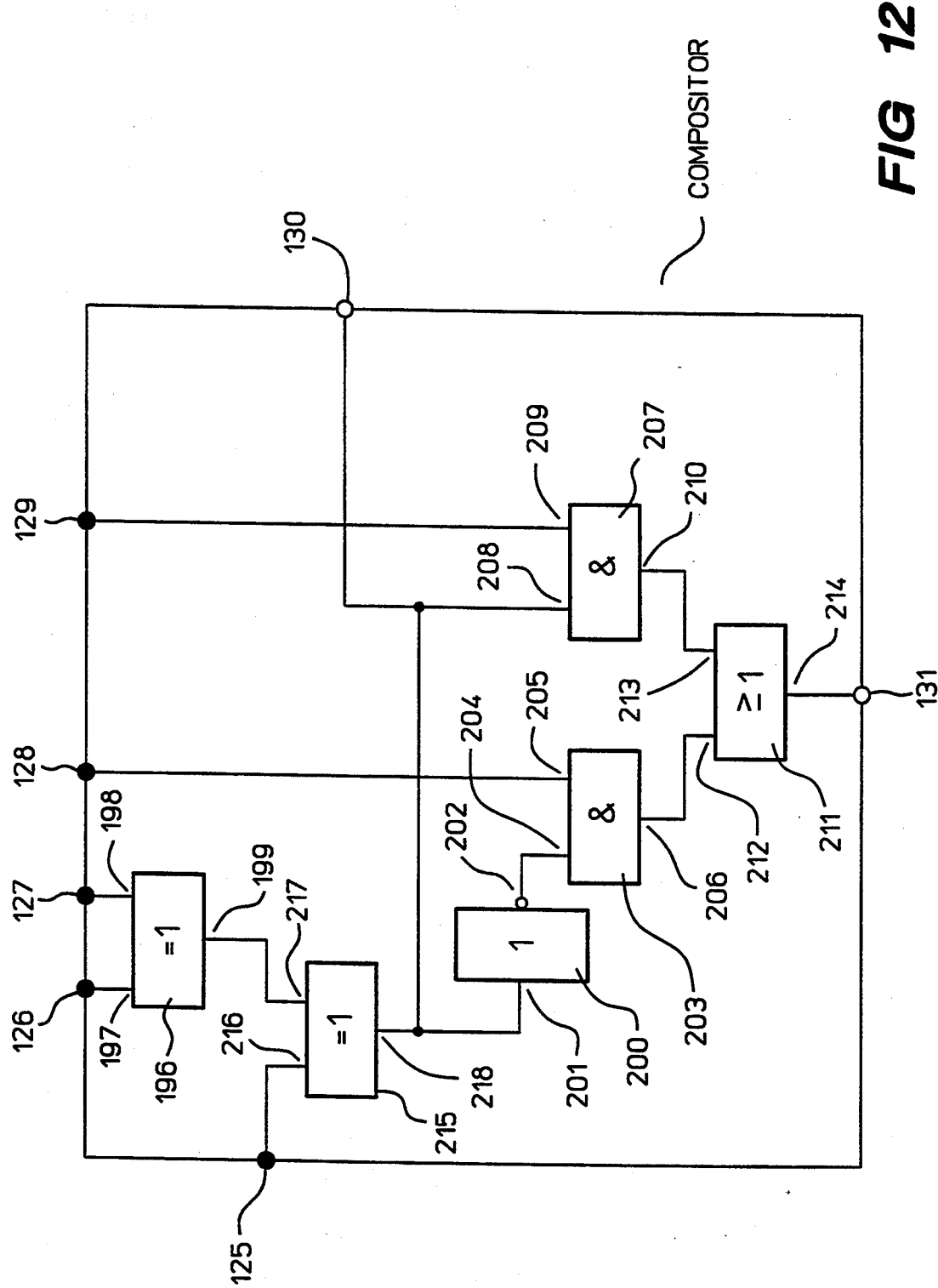
FIG. 12 shows the logic gates used to implement the basic cell in FIG. 9.

FIG. 12 shows one method of implementing the basic cell of the second preferred embodiment using logic gates, if the data in the first 30 and second 34 sets of data are binary. The basic cell consists of two EXCLUSIVE-OR gates, one INVERTER, two AND gates and one OR gate.

The first EXCLUSIVE-OR gate 196 with two inputs 197, 198, and one output, 199, has one of its inputs 197 connected to the first-selection-input node 126 and the other input 198 connected to the second-selection-input node 127. The second EXCLUSIVE-OR gate 215 with two inputs 197, 198 and one output 199, has one input 216 connected to the maintain-selection-input node 125, and the second input 217 connected to the output 199 of the first EXCLUSIVE-OR gate 196. The output 218 of the second EXCLUSIVE-OR gate 215 is connected to the maintain-selection-output node 130. The INVERTER 200, with an input 201 and an output 202, has the input 201 connected to the output 218 of the second EXCLUSIVE-OR gate 215. The first AND gate 203, with two inputs 204, 205, and one output 206, has one of its inputs 204 connected to the output 202 of the INVERTER 200, and the other input 205 connected to the first-data-input node 128. The second AND gate 207, with two inputs 208, 209, and one output 210, has one of its inputs 208 connected to the output 218 of the second EXCLUSIVE-OR gate 215 and the other input 209 connected to the second-data-input node 129. The OR gate 211, with two inputs 212, 213, and one output 214, has one of its inputs 212 connected to the output 206 of the first AND gate 203 and its second input 213 connected to the output 210 of the second AND gate 207. The output 214 of the OR gate 211 is connected to the selected-output node 131. Note that the signal on the maintain-selection-output node 130 depends on "EXCLUSIVE-OR"ing the signal on the maintain-selection-input node 125 only once.

Figure 13:
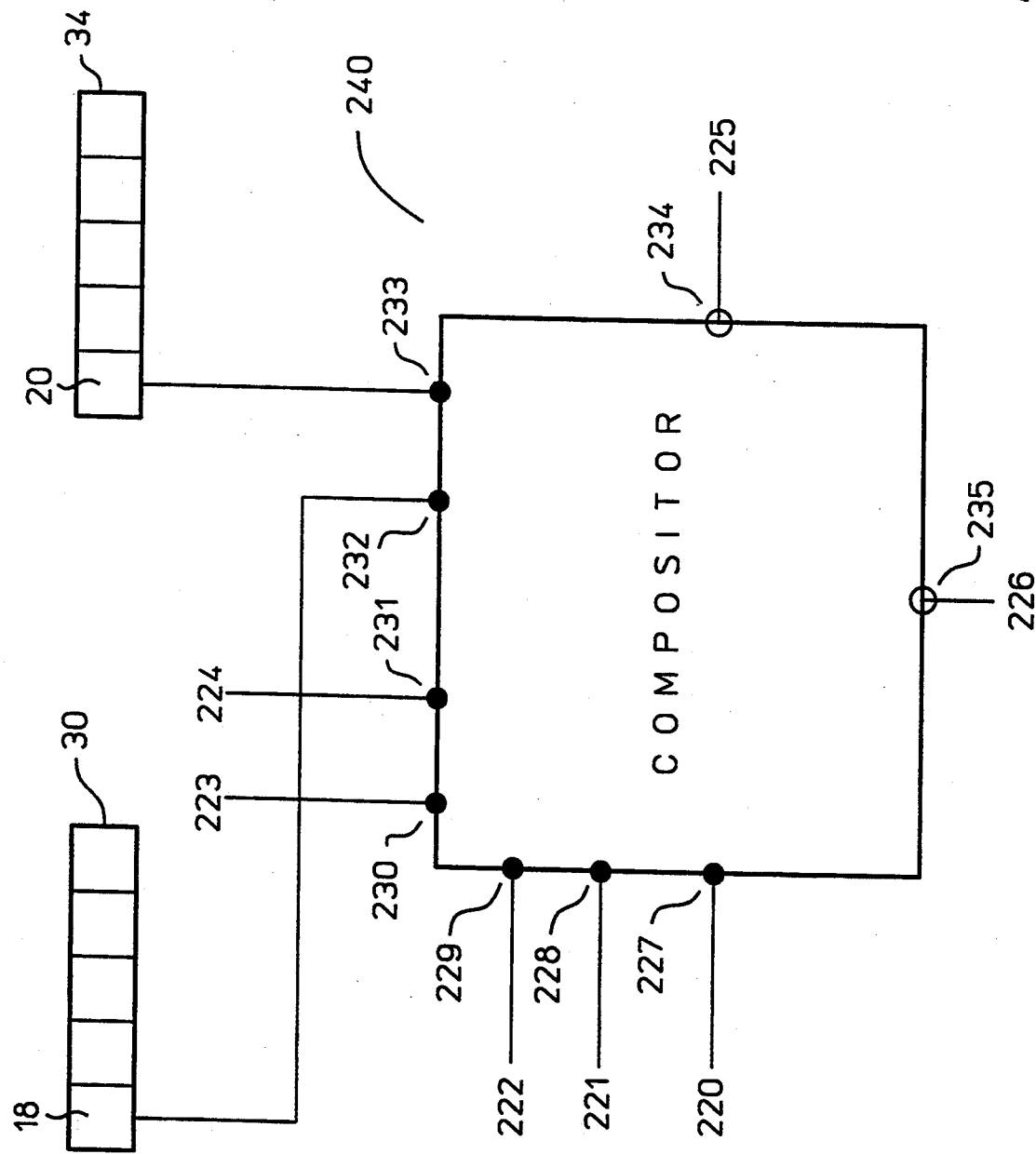
FIG. 13 shows a basic cell of the third preferred embodiment of the present invention.

FIG. 13 shows a third preferred embodiment of the present invention which is especially easily implemented in integrated technology because a plurality of the basic cells, as shown in FIG. 13, with the routing among the cells, can be regularly arranged in a two-dimension manner. The basic cell, adapted for building a two-dimension array, is similar to the first preferred embodiment except that the basic cell generates a begin-selection-input signal and an end-selection-input signal from the received begin-row-selection-input signal, begin-column-selection-input signal, end-row-selection-input signal, and end-column-selection-input signal.

In this embodiment, as in the previous embodiments, the field compositor composes a word by selecting data either from a first or a second set of data. The selection is based on the logic levels of five different sets of input control signals, namely, a maintain-selection-input signal, a plurality of begin-row-selection-input signals, a plurality of begin-column-selection-input signals, a plurality of end-row-selection-input signals, and a plurality of end-column-selection-input signals.

The central structure of the compositor is an initial basic cell 240 which has seven input nodes and two output nodes. The seven input nodes are a maintain-election-input node 227, an end-row-selection-input node 228, a begin-row-selection-input node 229, a begin-column-selection-input node 230, an end-column-selection-input node 231, a first-data-input node 232, and a second-data-input node 233. The two output nodes are a maintain-selection-output node 234 and a selected-output node 235. The maintain-selection-input node 227 is for receiving the maintain-selection-input signal 220. The end-row-selection-input node 228 is for receiving a first one of the end-row-selection-input signals 221. The begin-row-selection-input node 229 is for receiving a first one of the begin-row-selection-input signals 222. The begin-column-selection-input node 230 is for receiving a first one of the begin-column-selection-input signals 223. The end-column-selection-input node 231 is for receiving a first one of the end-column-selection-input signals 224. The basic cell has a first and a second logic elements; the first logic element ANDs the received begin-row-selection-input signal 222 and the received begin-column-selection-input signal 223 to produce a begin-selection-input signal; the second logic element ANDs the received end-row-selection-input signal 221 and the received end-column-selection-input signal 224 to produce an end-selection-input signal. The first-data-input node 232 is for receiving an initial data 18 in a first set of data 30. The second-data-input node 233 is for receiving an initial data 20 in a second set of data 34.

The cell 240 produces two output signals, a maintain-selection-output signal 225 and a selected-output signal 226 with the maintain-selection-output signal 225 at the maintain-selection-output node 234 and the selected-output signal 226 at the selected-output node 235.

The logic level of the maintain-selection-output signal 225 depends on the logic levels of the begin-selection-input signal and the end-selection-input signal. If the begin-selection-input signal is of the same logic level as the end-selection-input signal, then the maintain-selection-output signal 225 is of the same logic level as the maintain-selection-input signal 220, otherwise the maintain-selection-output signal 225 is of the opposite logic level as the maintain-selection-input signal 220.

The selected-output signal 226 is either from the initial data 18 of the first set of data 30 or from the initial data 20 of the second set of data 34 depending on the logic levels of the maintain-selection-input signal 220 and the begin-selection-input signal. If the maintain-selection-input signal 220 is of the same logic level as the begin-selection-input signal, the selection output signal 226 is determined by the initial data 18 received from the first-data-input node 232, otherwise, the selection output signal 226 is determined by the initial data 20 of the second-data-input node 233. FIG. 14 shows the logic table of the operation of the basic cell in FIG. 13.

Figure 15:
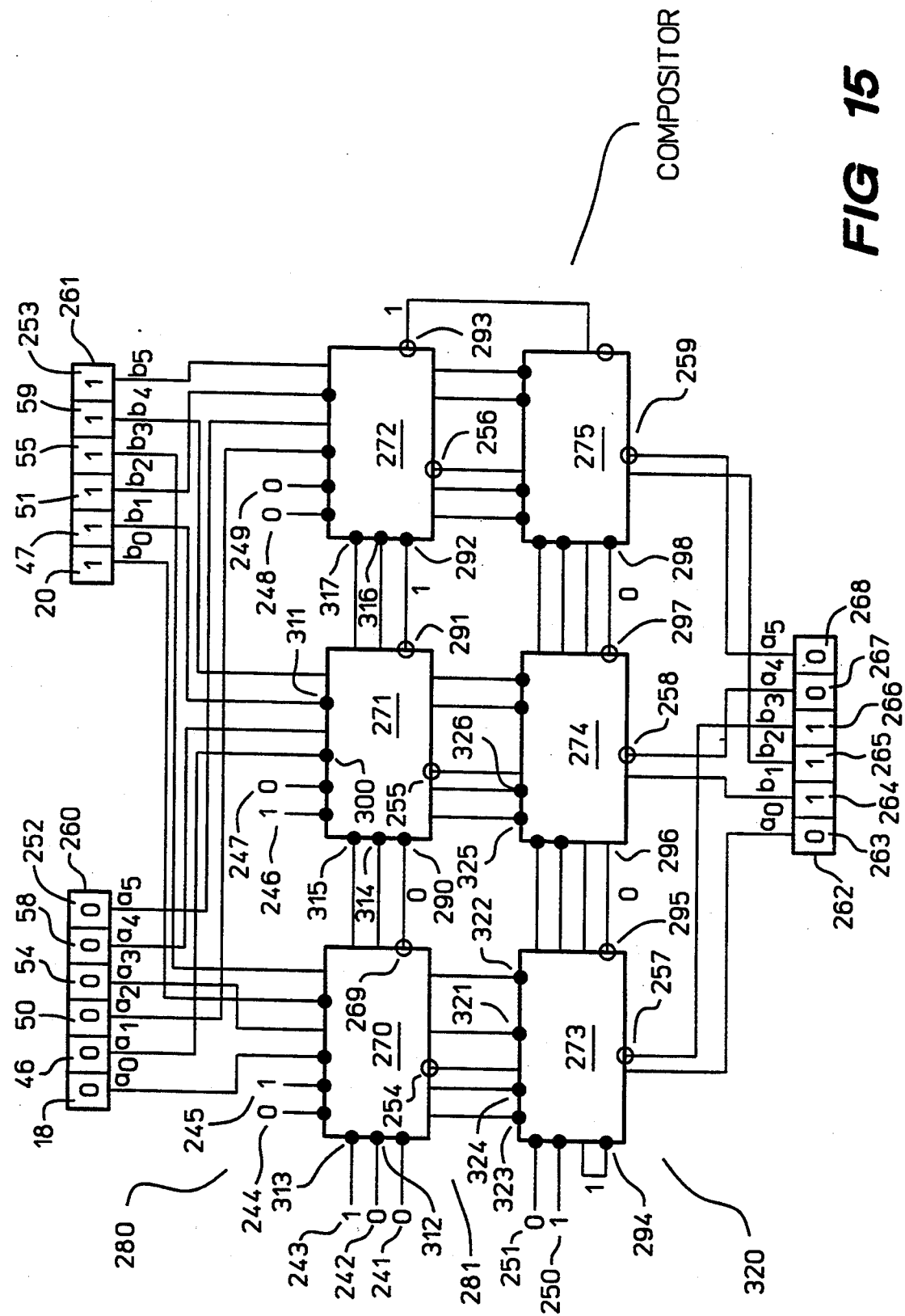
FIG. 15 shows a two-dimension array of basic cells of the kind shown in FIG. 13.

The compositor can be adopted to compose word of any size by systematically constructing the basic cells to form a two-dimension array. FIG. 15 shows an example with five basic cells, 271, 272, 273, 274, and 275, each having a structure similar to that of the initial basic cell 270, forming a two-dimension array 280.

The array 280 has an initial row 281 of basic cells 270, 271, and 272 which is formed by having the maintain-selection-input node of each cell after the initial cell 270 connected to the maintain-selection-output node of the immediately preceding cell, such as the maintain-selection-input node 290 of the second cell 271 connected to the maintain-selection-output node 269 of the initial cell 270.

The first-data-input nodes of successive cells receive the successive data in the first set of data, such as the first-data-input node 300 of the second cell 271 receives the successive data 46 in the first set of data 260 after the data 18 received by the initial cell 270; similarly the second-data-input nodes receive the successive data in the second set of data 261, such as the second-data-input node 311 of the second cell 271 receives the successive data 47 in the second set of data 261 after the data 20 received by the initial cell 270.

The first begin-row-selection-input signal 243 at the begin-row-selection-input node 313 of the initial cell 270 is provided at the begin-row-selection-input node of each cell in the first row, such as the begin-row-selection-input node 315 of the second cell 271.

Similarly, the first end-row-selection-input signal 242 at the end-row-selection-input node 312 of the initial cell 270 is provided at the end-row-selection-input node of each cell in the row, such as the end-row-selection-input node 314 of the second cell 271.

The array 280 has more than one row of basic cells; each row has a structure similar to that of the initial row 281. The maintain-selection-input node of each initial cell of each row after the initial row is coupled to the maintain-selection-output node of the last cell of the immediately preceding row, such as the maintain-selection-input node 294 of the initial cell 273 of the second row 320 is coupled to the maintain-selection-output node 293 of the last cell 272 of the immediately preceding row, the initial row 281.

The first-data-input node of each initial cell of each row after the initial row is connected to receive, from the first set of data, the data immediately after the data received by the last cell of the immediately preceding row, such as the first-data-input node 321 of the initial cell 273 of the second row 320 is connected to receive the data 54 in the first set of data 260 after the data 50 received by the last cell 272 of the immediately preceding row, the initial row 281.

The second-data-input node of each initial cell of each row after the initial row is connected to receive, from the second set of data, the data immediately after the data received by the last cell of the immediately preceding row, such as the second-data-input node 322 of the initial cell 273 of the second row 320 is connected to receive the data 55 in the second set of data 261 after the data 51 received by the last cell 272 of the immediately preceding row, the initial row 281.

The begin-column-selection-input node of each initial cell of each row after the initial row is coupled to the begin-column-selection-input node of the initial cell of the initial row, such as the begin-column-selection-input node 323 of the initial cell 273 of the second row 320 is coupled to the begin-column-selection-input node 244 of the initial cell 270 of the initial row 281.

The end-column-selection-input node of each initial cell of each row after the initial row is coupled to the end-column-selection-input node of the initial cell of the initial row, such as the end-column-selection-input node 324 of the initial cell 273 of the second row 320 is coupled to the end-column-selection-input node 245 of the initial cell 270 of the initial row 281.

The begin-column-selection-input node of each successive cell after the initial cell in each row after the initial row 281 is coupled to the successive begin-column-selection-input node in the corresponding cell in the initial row, such as the begin-column-selection-input node 325 of the second cell 274 in the second row 320 is coupled to the begin-column-selection-input node 246 in the second cell 271 in the initial row 281.

The end-column-selection-input node of each successive cell after the initial cell in each row after the initial row 281 is coupled to the successive end-column-selection-input node in the initial row, such as the end-column-selection-input node 326 of the second cell 274 in the second row 320 is coupled to the end-column-selection-input node 247 in the initial row 281.

The above structure is to ensure data from the first set of data and from the second set of data are selectively received by the output nodes of the cells to provide the composed word according to the logic levels of the various input control signals applied to the cells.

The operation of the two-dimension array in FIG. 15 is similar to the operation of the one-dimensional array in FIG. 6; the logic table of FIG. 14 is similar to the logic table in FIG. 5 except that in FIG. 14 the column labelled $B_i$, which corresponds with the begin selection signal in FIG. 5, is really the AND product of $B_{ri}$, the begin row selection signal, and $B_{ci}$, the begin column selection signal, in FIG. 15; and similarly the column labelled $E_i$, which corresponds with the end selection signal in FIG. 5, is really the AND product of $E_{ri}$, the end row selection signal, and $E_{ci}$, the end column selection signal, in FIG. 15.

The first four rows of logic levels in FIG. 14 again describe the operations of the two-dimension array of basic cells in FIG. 15 with the particular input signal levels shown. The first row describes the operation of the initial cell 270 of the first row 281 and the third cell 275 of the second row 320; the second row describes the operations of the second cell 271 of the first row 281 and the second cell 274 of the second row 320; the third row describes the operation of the third cell 272 of the first row; the fourth row describes the operation of the initial cell 273 of the second row 320. By deciding when to set $B_{ri}$, $B_{ci}$, $E_{ri}$, and $E_{ci}$ to be high, a field F "111" having the data ($b_1$, $b_2$, and $b_3$), 47, 51, and 55, of the second data set 261 is merged into the first data set 260 to generate the composed word "011100" 262.

The composition of the word 262 can be performed in one operation (one clock cycle) without the need for any intermediate storage element. The field F, in the above example "111," is specified by its left and right boundaries rather than with an intermediate storage element.

Only a single type of basic cell is needed to construct a field compositor of arbitrary size with regular ordering of the unit cells and structured wiring routed to the cells. The regular and iterative nature of the invention make it suitable to be fabricated as an integrated circuit and make it very easy to integrate with silicon compilers and logic synthesis systems.

Figure 16:
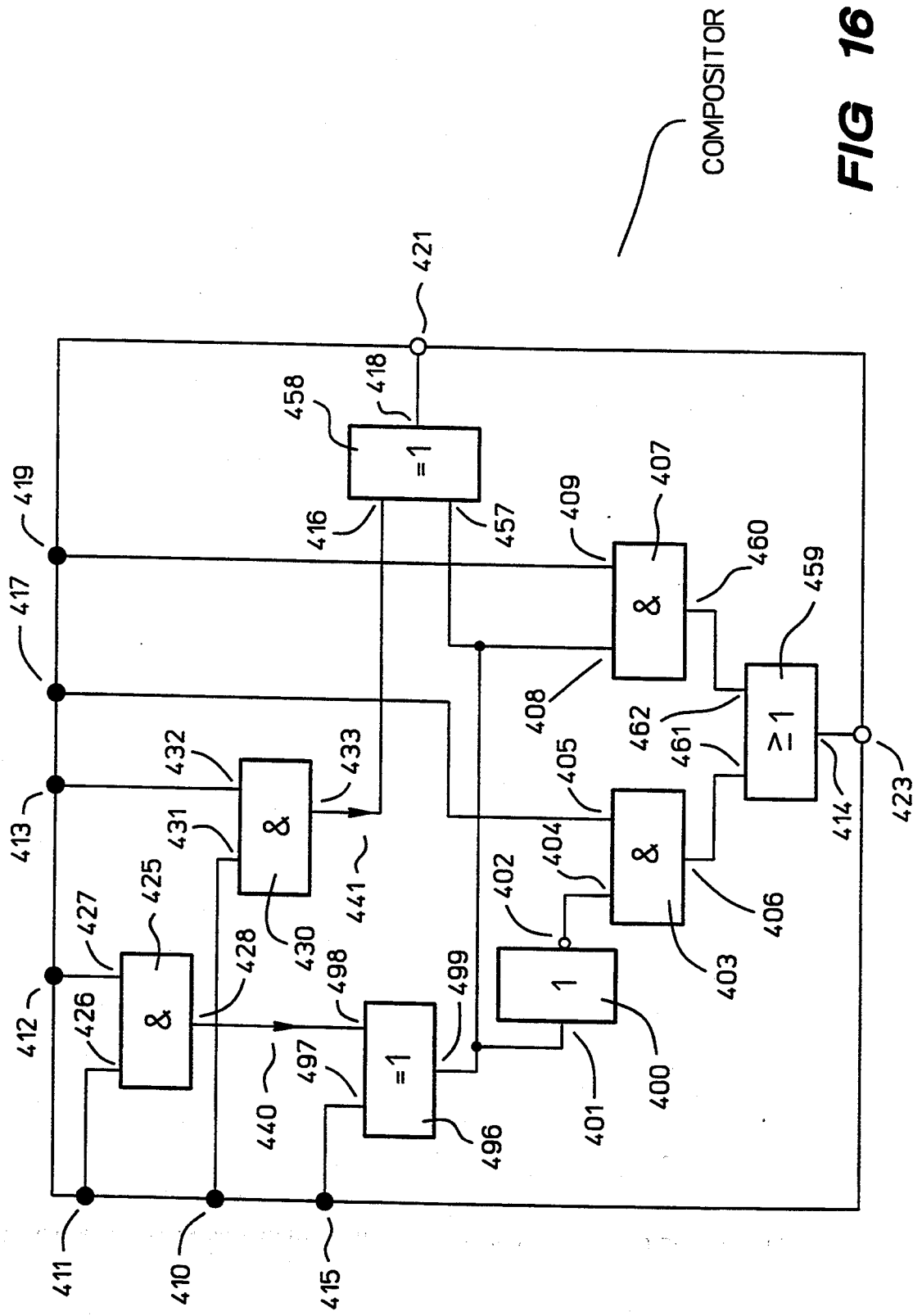
FIG. 16 shows the logic gates used to implement the basic cell in FIG. 13.

FIG. 16 shows one method to implement the basic cell of the third preferred embodiment using logic gates, if the first 260 and the second 261 sets of data are binary signals. The basic cell consists of two EXCLUSIVE-OR gates, one INVERTER, four AND gates and one OR gate; as explained above, the cell is similar to the one in FIG. 8, except for two additional AND gates 425 and 430.

The first AND gate 425, with two inputs 426, 427, and one output, 428, has one input 426 connected to the begin-row-selection-input node 411, and the other input 427 connected to the begin-column-selection-input node 412, to provide the begin-selection-input signal 440 at the output 428.

The second AND gate 430 with, two inputs 431, 432, and one output 433, has one input 431 connected to the end-row-selection-input node 410, and the other input 432 connected to the end-column-selection-input node 413, to provide the end-selection-input signal 441 at the output 433.

The first EXCLUSIVE-OR gate 496 with two inputs 497, 498, and one output, 499, has one of its inputs 497 connected to the maintain-selection-input node 415 and the other input 498 connected for receiving begin-selection-input signal 440. The INVERTER 400, with an input 401 and an output 402, has the input 401 connected to the output 499 of the first EXCLUSIVE-OR gate 496. The third AND gate 403, with two inputs 404, 405, and one output 406, has one of its inputs 404 connected to the output 402 of the INVERTER 400, and the other input 405 connected to the first-data-input node 417. The fourth AND gate 407, with two inputs 408, 409, and one output 460, has one of its inputs 408 connected to the output 499 of the first EXCLUSIVE-OR gate 496 and the other input 409 connected to the second-data-input node 419. The OR gate 459, with two inputs 461, 462, and one output 414, has one of its inputs 461 connected to the output 406 of the third AND gate 403 and its second input 462 connected to the output 460 of the fourth AND gate 407. The output 414 of the OR gate 459 is connected to the selected-output node 423. The second EXCLUSIVE-OR gate 458, with two inputs 416, 457, and one output 418, has one input 416 connected to receive the end-selection-input signal 441, and the other input 457 connected to the output 499 of the first EXCLUSIVE-OR gate 496. The output 418 of the second EXCLUSIVE-OR gate 458 is connected to the maintain-selection-output node 421. Note that the signal on the maintain-selection-output node 421 again depends on "EXCLUSIVE-OR"ing the signal on the maintain-selection-input node 415 two times.

The two-dimension array can be implemented with a structure based on the second embodiment, with the first-selection-input being the AND product of a first row selection input and a first column selection input, and with the second-selection-input being the AND product of a second row selection input and a second column selection input. Then, the signal on the maintain-selection-output node of such a two-dimension cell would only depend on "EXCLUSIVE-OR"ing the signal on its maintain-selection-input node once.

If data from the first set only merges into one area, instead of multi-non-contiguous areas, of the data in the second set then there is another method to reduce the time needed to generate the signal provided at the maintain-selection-input node of the last cell in a two-dimension array. This method is based on a Maintain-Selection-Lookahead-Module (MSLM) which generates the signal provided at the maintain-selection-input node for the initial cell of each row directly from the begin selection row input and the end selection row input of the initial cell of each row together with the maintain-selection-input for the initial cell of the initial row.

The rationale behind the MSLM is as follows: a begin-row-selection-input signal or an end-row-selection-input signal being high in any row indicates that the field to be merged either begins or ends in that row. As an example, referring to FIG. 15, the signal provided at the maintain-selection-input node for the initial cell in the second row 320 can be "looked-ahead" from the signals provided to the initial cell in the first row 281 : the maintain-selection-input signal 241, the begin-row-selection-input signal 243 and the end-row-selection-input signal 242. If the begin-row-selection-input signal 243 of the first row is high, and the end-row-selection-input signal 242 for the first row is low, then one of the cells in the first row will have a begin-column-selection-input signal high, and that is the cell where merging would begin; in this case, it is the second cell 271. The maintain-selection-output signal of cell 271 is set to be of an opposite level as to the signal provided at its maintain-selection-input node. This maintain-selection-output signal is sustained at the next cell 272 and is the signal at the maintain-selection-input node of the initial cell 273 of the second row. So, the signal provided at the maintain-selection-input node for the initial cell in the second row can be "looked-ahead" from the signals provided to the initial cell in the first row.

Figure 17:
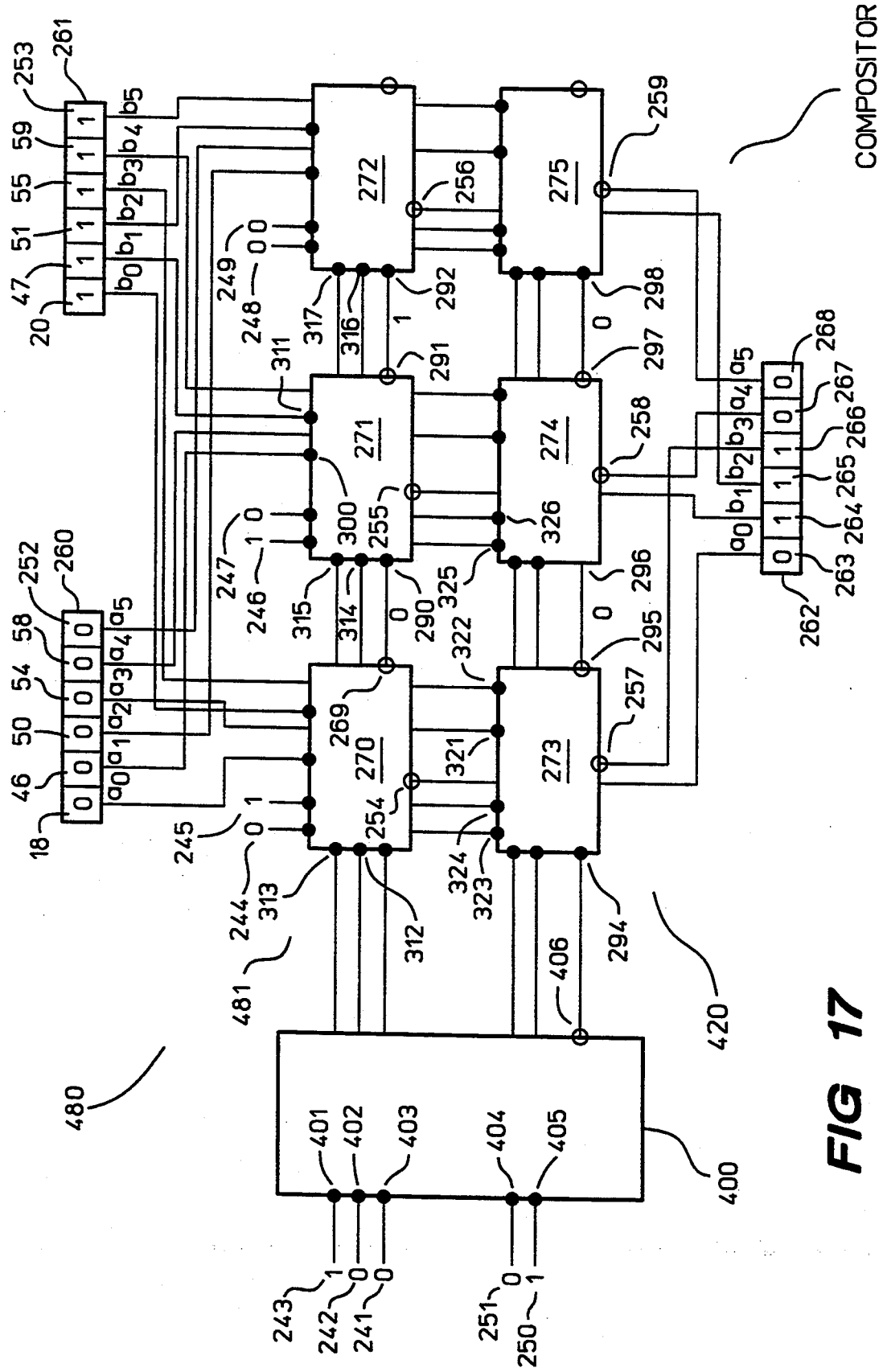
FIG. 17 shows a 2 by 3 two-dimension array of basic cells of the kind shown in FIG. 13 with a Maintain-Selection-Lookahead-Module.

FIG. 17 shows a two-dimension array 480, similar to that shown in FIG. 15, and a Maintain-Selection-Lookahead-Module 400.

The array 480 has an initial row 481 of basic cells 270, 271, and 272. The initial row 481 is formed by having the maintain-selection-input node of each cell after the initial cell 270 connected to the maintain-selection-output node of the immediately preceding cell, such as the maintain-selection-input node 290 of the second cell 271 connected to the maintain-selection-output node 269 of the initial cell 270.

The array 480 has additional rows of basic cells; one of which, 420, is shown. Each row has a structure similar to that of the initial row 481.

The module 400 has a maintain-selection-input node 403 for receiving the maintain-selection-input signal 241. The module 400 also has a plurality of input nodes 401, and 404 for receiving the plurality of begin-row-selection-input signals 243, and 251 of each of the initial cell in each row; and a plurality of input nodes 402, and 405 for receiving the plurality of end-row-selection-input signals 242, 250 of each of the initial cell in each row. The module 400 produces a plurality of signals provided at the maintain-selection-input nodes for the initial cell in each row, such as the output signal 406 for the initial cell 273 in the second row 420 of the array 480.

Each initial cell of each row after the initial row 481 has a maintain-selection-input node for receiving a maintain-selection-output signal from the module 400. For example, the maintain-selection-input node 294 of the initial cell 273 of the second row 420 receives the maintain-selection-output signal 406 from the module 400.

The rest of the structure of the array in FIG. 17 is similar to the array in FIG. 15.

The following logic equations define the Maintain-selection-inputs, $M_{ri}$, for rows 1–3 of the 16-bit, 4*4 array of FIG. 18. The representations of the logic functions are shown in FIG. 7.

$M_{r1} = (B_{r0} * \overline{E}_{r0}) \oplus M_0$
$M_{r2} = (B_{r0} * \overline{E}_{r0} * \overline{E}_{r1} + B_{r1} * \overline{E}_{r1}) \oplus M_0$
$M_{r3} = (B_{r0} * \overline{E}_{r0} * \overline{E}_{r1} * \overline{E}_{r2} + B_{r1} * \overline{E}_{r1} * \overline{E}_{r2} + B_{r2} * \overline{E}_{r2})$
$\oplus M_0$ In general, the Maintain-selection-inputs for row i can be represented by the following equation $$M_{ri} = \left( \sum_{j=0}^{i-1} B_{rj} \prod_{k=j}^{i-1} \overline{E}_{rk} \right) \oplus M_0$$

where $\Sigma$ represents the logical OR summation and $\Pi$ represents the logical AND product. These equations, together with the knowledge of the number of rows required for the two-dimension array, define the structure of the module 400.

From the foregoing, it will be appreciated that the invention embodied in a novel method to merge sets of data in one machine cycle without any extra intermediate storage element that depends on the size of the merged data. Moreover, the present invention is based on very regular arrangements of basic cells which reduces the problem of routing signals in the merging operation and is easily implemented in integrated technologies.

Although a specific embodiment of the invention has been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

I claim:

1. A field compositor for composing a word by selecting data either from a first or from a second set of data based on three different sets of input control signals, namely, a maintain-selection-input signal, a plurality of begin-selection-input signals and a plurality of end-selection-input signals, each signal having a logic level selected from at least two logic levels, which are opposite to each other, the compositor comprising an initial cell and another cell with structure similar to the initial cell, the initial cell including:

a maintain-selection-input node for receiving the maintain-selection-input signal;
a begin-selection-input node for receiving a first one of the begin-selection-input signals;
an end-selection-input node for receiving a first one of the end-selection-input signals;
a first-data-input node for receiving an initial data in the first set of data;
a second-data-input node for receiving an initial data in the second set of data;
a maintain-selection-output node; and
a selected-output node; and
the initial cell operative to produce
a maintain-selection-output signal at the maintain-selection-output node, the maintain-selection-output signal being the same logic level as the signal provided at the maintain-selection-input node if the begin-selection-input signal has the same logic level as the end-selection-input signal, the maintain-selection-output signal being the opposite logic level as the signal provided at the maintain-selection-input node if the begin-selection-input signal has the opposite logic level as the end-selection-input signal; and
a selected-output signal at the selected-output node, the selected-output signal being determined by the data provided at the first-data-input node if the signal provided at the maintain-selection-input node has the same logic level as the begin-selection-input signal, the selected-output signal being determined by the data provided at the second-data-input node if the signal provided at the maintain-selection-input node has the opposite logic level as the begin-selection-input signal;
such that the maintain-selection-output node of the initial cell is connected to the maintain-selection-input node of the other cell so that the maintain-selection output signal of the initial cell controls the signal at the selected-output node of the other cell.

2. A field compositor as in claim 1 and further comprising:

a plurality of cells each having a structure similar to that of the initial cell;
the maintain-selection-input node of each cell after the initial cell connected to the maintain-selection-output node of an immediately preceding cell;
the begin-selection-input node of each cell for receiving a begin-selection-input signal;
the end-selection-input node of each cell for receiving an end-selection-input signal;
the first-data-input nodes of successive cells connected to receive successive data from the first set of data; and
the second-data-input nodes of successive cells connected to receive successive data from the second set of data;
whereby data from the first set of data and from the second set of data are selectively received by the selected-output nodes of the cells to provide the composed word according to the logic levels of the various input control signals applied to the cells.

3. A field compositor as in claim 1 wherein the first set and the second set of data are binary data.

4. A field compositor as in claim 3 wherein the initial cell comprises:

a first EXCLUSIVE-OR gate with two inputs and one output, one input being connected to the maintain-selection-input node and the second input being connected to the begin-selection-input node;
an INVERTER with an input and an output, the input being connected to the output of the first EXCLUSIVE-OR gate;
a first AND gate with two inputs and one output, one input being connected to the output of the IN- VERTER, and the second input being connected to the first-data-input node;

a second AND gate with two inputs and one output, one input being connected to the output of the first EXCLUSIVE-OR gate, the second input being connected to the second-data-input node;

an OR gate with two inputs and one output, one input connected to the output of the first AND gate and the second input connected to the output of the second AND gate, the output of the OR gate connected to the selected-output node; and a second EXCLUSIVE-OR gate with two inputs and one output, one input connected to the end-selection-input node, the second input connected to the output of the first EXCLUSIVE-OR gate, the output of the second EXCLUSIVE-OR gate connected to the maintain-select/on-output node.

5. A field compositor for composing a word by selecting data either from a first or from a second set of data based on three different sets of input control signals, namely, a maintain-selection-input signal, a plurality of first-selection-input signals and a plurality of second-selection-input signals, each signal having a logic level selected from at least two logic levels, which are opposite to each other, with one being a high level, the compositor comprising an initial cell and another cell with structure similar to the initial cell, the initial cell including:

a maintain-selection-input node for receiving the maintain-selection-input signal;

a first-selection-input node for receiving a first one of the first-selection-input signals;

a second-selection-input node for receiving a first one of the second-selection-input signals;

a first-data-input node for receiving an initial data in the first set of data;

a second-data-input node for receiving an initial data in the second set of data;

a maintain-selection-output node; and a selected-output node; and the initial cell operative to produce a maintain-selection-output signal at the maintain-selection-output node, the maintain-selection-output signal being the same logic level as the signal provided at the maintain-selection-input node if the first-selection-input signal has the same logic level as the second-selection-input signal, the maintain-selection-output signal being the opposite logic level as the signal provided at the maintain-selection-input node if the first-selection-input signal has the opposite logic level as the second-selection-input signal; and a selected-output signal at the selected-output node, the selected-output signal being determined by the data provided at the first-data-input node if an even number of input control signals are at a high level, the selection output signal being determined by the data provided at the second-data-input node if an odd number of input control signals are at a high level;

such that the maintain-selection-output node of the initial cell is connected to the maintain-selection-input node of the other cell so that the maintain-selection output signal of the initial cell controls the signal at the selected-output node of the other cell.

6. A field compositor as in claim 5 and further comprising:

a plurality of cells each having a structure similar to that of the initial cell;

the maintain-selection-input node of each cell after the initial cell connected to the maintain-selection-output node of an immediately preceding cell;

the first-selection-input node of each cell for receiving a first-selection-input signal;

the second-selection-input node of each cell for receiving a second-selection-input signal;

the first-data-input nodes of successive cells connected to receive successive data from the first set of data; and the second-data-input nodes of successive cells connected to receive successive data from the second set of data;

whereby data from the first set of data and from the second set of data are selectively received by the selected-output nodes of the cells to provide the composed word according to the logic levels of the various input control signals applied to the cells.

7. A field compositor as in claim 5 wherein the first set of data and the second set of data are binary data.

8. A field compositor as in claim 7 wherein the initial cell comprises:

a first EXCLUSIVE-OR gate with two inputs and one output, one input being connected to the first-selection-input node and the second input being connected to the second-selection-input node;

a second EXCLUSIVE-OR gate with two inputs and one output, one input connected to the maintain-selection-input node, the second input connected to the output of the first EXCLUSIVE-OR gate, and the output of the second EXCLUSIVE-OR gate connected to the maintain-selection-output node;

an INVERTER with an input and an output, the input being connected to the output of the second EXCLUSIVE-OR gate;

a first AND gate with two inputs and one output, one input being connected to the output of the INVERTER, and the second input being connected to the first-data-input node;

a second AND gate with two inputs and one output, one input being connected to the output of the second EXCLUSIVE-OR gate, the second input being connected to the second-data-input node; and an OR gate with two inputs and one output, one input connected to the output of the first AND gate and the second input connected to the output of the second AND gate, the output of the OR gate connected to the selected-output node.

9. A field compositor for composing a word by selecting data either from a first or from a second set of data based on five different sets of input control signals, namely, a maintain-selection-input signal, a plurality of begin-row-selection-input signals, a plurality of begin-column-selection-input signals, a plurality of end-row-selection-input signals, and a plurality of end-column-selection-input signals, each signal having a logic level selected from at least two logic levels, which are opposite to each other, the compositor comprising an initial cell and another cell with structure similar to the initial cell, the initial cell including:

a maintain-selection-input node for receiving the maintain-selection-input signal;

a begin-row-selection-input node for receiving a first one of the begin-row-selection-input signals;

a begin-column-selection-input node for receiving a first one of the begin-column-selection-input signals;

a first logic means ANDing the received begin-row-selection-input signal and the received begin-column-selection-input signal to produce a begin-selection-input signal;

an end-row-selection-input node for receiving a first one of the end-row-selection-input signals;

an end-column-selection-input node for receiving a first one of the end-column-selection-input signals;

a second logic means ANDing the received end-row-selection-input signal and the received end-column-selection-input signal to produce an end-selection-input signal;

a first-data-input node for receiving an initial data in the first set of data;

a second-data-input node for receiving an initial data in the second set of data;

a maintain-selection-output node; and a selected-output node; and the initial cell operative to produce a maintain-selection-output signal at the maintain-selection-output node, the maintain-selection-output signal being the same logic level as the signal provided at the maintain-selection-input node if the begin-selection-input signal has the same logic level as the end-selection-input signal, the maintain-selection-output signal being the opposite logic level as the signal provided at the maintain-selection-input node if the begin-selection-input signal has the opposite logic level as the end-selection-input signal; and a selected-output signal at the selected-output node, the selected-output signal being determined by the data provided at the first-data-input node if the signal provided at the maintain-selection-input node has the same logic level as the begin-selection-input signal, the selected-output signal being determined by the data provided at the second-data-input node if the signal provided at the maintain-selection-input node has the opposite logic level as the begin-selection-input signal;

such that the maintain-selection-output node of the initial cell is connected to the maintain-selection-input node of the other cell so that the maintain-selection output signal of the initial cell controls the signal at the selected-output node of the other cell.

10. A field compositor as in claim 9 and further comprising:

a plurality of cells forming an initial row of cells, each cell having a structure similar to that of the initial cell, the maintain-selection-input node connected to the maintain-selection-output node of an immediately preceding cell, the begin-row-selection-input signal at the begin-row-selection-input node of the initial cell provided at the begin-row-selection-input node, the begin-column-selection-input node for receiving a begin-column-selection-input signal, the end-row-selection-input signal at the end-row-selection-input node of the initial cell provided at the end-row-selection-input node, the end-column-selection-input node for receiving an end-column-selection-input signal, the first-data-input node connected to receive, from the first set of data, the data immediately following the data received by an immediately preceding cell, the second-data-input node connected to receive, from the second set of data, the data immediately following the data received by an immediately preceding cell;

a plurality of rows of cells, each row having a structure similar to that of the initial row;

each initial cell of each row after the initial row having the maintain-selection-input node coupled to the maintain-selection-output node of a last cell of an immediately preceding row, the first-data-input node connected to receive, from the first set of data, the data immediately following the data received by a last cell of an immediately preceding row, the second-data-input node connected to receive, from the second set of data, the data immediately following the data received by a last cell of an immediately preceding row, the begin-column-selection-input node coupled to the begin-column-selection-input node of the initial cell of the initial row, and the end-column-selection-input node coupled to the end-column-selection-input node of the initial cell of the initial row; and each successive cell after the initial cell in each row after the initial row having the begin-column-selection-input node coupled to the successive begin-column-selection-input node in the initial row, the end-column-selection-input node coupled to the successive end-column-selection-input node in the initial row;

whereby data from the first set of data and from the second set of data are selectively received by the output-select nodes of the cells to provide the composed word according to the logic levels of the various input control signals applied to the cells.

11. A field compositor as in claim 9 wherein the first set of data and the second set of data are binary data.

12. A field compositor as in claim 11 wherein:

the first logic means is a first AND gate with two inputs and one output, one input connected to the begin-row-selection-input node, and the other input connected to the begin-column-selection-input node, to provide the begin-selection-input signal at the output;

the second logic means is a second AND gate with two inputs and one output, one input connected to the end-row-selection-input node, and the other input connected to the end-column-selection-input node, to provide the end-selection-input signal at the output; and wherein the initial cell further comprises:

a first EXCLUSIVE-OR gate with two inputs and one output, one input being connected to the maintain-selection-input node and the second input connected for receiving the begin-selection-input signal;

an INVERTER with an input and an output, the input being connected to the output of the first EXCLUSIVE-OR gate;

a third AND gate with two inputs and one output, one input being connected to the output of the INVERTER, and the second input being connected to the first-data-input node;

a fourth AND gate with two inputs and one output, one input being connected to the output of the first EXCLUSIVE-OR gate, the second input being connected to the second-data-input node;

an OR gate with two inputs and one output, one input connected to the output of the third AND gate and the second input connected to the output of the fourth AND gate, the output of the OR gate connected to the selected-output node; and a second EXCLUSIVE-OR gate with two inputs and one output, one input connected for receiving the end-selection-input signal, the second input connected to the output of the first EXCLUSIVE-OR gate, the output of the second EXCLUSIVE-OR gate connected to the maintain-selection-output node.

13. A field compositor as in claim 9 and further comprising:

a plurality of cells forming an initial row of cells, each cell having a structure similar to that of the initial cell, the maintain-selection-input node connected to the maintain-selection-output node of an immediately preceding cell, the begin-row-selection-input signal at the begin-row-selection-input node of the initial cell provided at the begin-row-selection-input node, the begin-column-selection-input node of each cell for receiving a begin-column-selection-input signal, the end-row-selection-input signal at the end-row-selection-input node of the initial cell provided at the end-row-selection-input node, the end-column-selection-input node of each cell for receiving an end-column-selection-input signal, the first-data-input node connected to receive, from the first set of data, the data immediately following the data received by an immediately preceding cell, the second-data-input node connected to receive, from the second set of data, the data immediately following the data received by an immediately preceding cell;

a plurality of rows of cells, each row having a structure similar to that of the initial row;

a maintain-selection-lookahead-module comprising:

a maintain-selection-input node for receiving the maintain-selection-input signal;

a plurality of input nodes for receiving the plurality of begin-row-selection-input signals of the initial cells in each row; and a plurality of input nodes for receiving the plurality of end-row-selection-input signals of the initial cells in each row;

the maintain-selection-lookahead-module operative to produce a plurality of maintain-selection-output signals, one signal being coupled to one of the maintain-selection-input node or the initial cell in each row;

each initial cell of each row after the initial row having the maintain-selection-input node for receiving a maintain-selection-output signal from the maintain-selection-lookahead-module, the first-data-input node connected to receive, from the first set of data, the data immediately following the data received by a last cell of an immediately preceding row, the second-data-input node connected to receive, from the second set of data, the data immediately following the data received by a last cell of an immediately preceding row, the begin-column-selection-input node coupled to the begin-column-selection-input node of the initial cell of the initial row, and the end-column-selection-input node coupled to tile end-column-selection-input node of the initial cell of the initial row; and each successive cell after the initial cell in each row after the initial row having the begin-column-selection-input node coupled to the successive begin-column-selection-input node in the initial row, and the end-column-selection-input node coupled to the successive end-column-selection-input node in the initial row;

whereby data from the first set of data and from the second set of data are selectively received by the output-select nodes of the cells to provide the composed word according to the logic levels of the various input control signals applied to the cells.

* * * * *